(12) United States Patent
Avagyan et al.

(10) Patent No.: US 9,898,515 B1
(45) Date of Patent: Feb. 20, 2018

(54) DATA EXTRACTION AND TRANSFORMATION METHOD AND SYSTEM

(71) Applicant: JPMorgan Chase Bank, N.A., New York, NY (US)

(72) Inventors: Vahram Avagyan, New York, NY (US); Andrea Fang, Brigdewater, NJ (US); Robert J. Prior, New York, NY (US); Vipul V. Shah, Scarsdale, NY (US); Jonathan Scott Hajek, Jackson Heights, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 456 days.

(21) Appl. No.: 14/527,345

(22) Filed: Oct. 29, 2014

(51) Int. Cl.
  G06F 7/00 (2006.01)
  G06F 17/00 (2006.01)
  G06F 17/30 (2006.01)

(52) U.S. Cl.
  CPC .... G06F 17/30563 (2013.01); G06F 17/3053 (2013.01); G06F 17/30241 (2013.01)

(58) Field of Classification Search
  CPC ......... G06F 17/30563; G06F 17/30241; G06F 17/3053
  USPC ........................................................ 707/602
  See application file for complete search history.

(56) References Cited

U.S. PATENT DOCUMENTS

| | | | |
|---|---|---|---|
| 2002/0128938 A1* | 9/2002 | Ronald Schofield .. | G06Q 30/06 705/35 |
| 2002/0144185 A1* | 10/2002 | Farago ................. | G06F 11/261 714/42 |
| 2003/0088562 A1* | 5/2003 | Dillon ................. | G06F 17/3061 |
| 2004/0107123 A1* | 6/2004 | Haffner ................ | G06Q 30/02 705/30 |
| 2004/0215656 A1* | 10/2004 | Dill .................... | G06F 17/30539 |
| 2005/0182780 A1* | 8/2005 | Forman ............... | G06F 17/30489 |
| 2006/0236234 A1* | 10/2006 | Michelstein ......... | G06F 17/2247 715/210 |
| 2010/0004997 A1* | 1/2010 | Mehta .................. | G06Q 30/02 705/14.66 |
| 2012/0173475 A1* | 7/2012 | Ash ..................... | G06F 17/30563 707/600 |
| 2012/0239670 A1* | 9/2012 | Horn ................... | G06F 17/30241 707/756 |
| 2014/0180807 A1* | 6/2014 | Boal .................... | G06Q 30/0245 705/14.53 |
| 2015/0058187 A1* | 2/2015 | Howe .................. | G06Q 30/0284 705/31 |
| 2015/0205846 A1* | 7/2015 | Aldridge .............. | G06F 19/322 707/602 |
| 2015/0356545 A1* | 12/2015 | Marcuccilli .......... | G06Q 20/322 705/40 |

* cited by examiner

Primary Examiner — Binh V Ho
(74) Attorney, Agent, or Firm — Calfee, Halter & Griswold LLP

(57) ABSTRACT

A system and method for processing raw transaction records received from multiple data sources. The system and method receive multiple raw transaction records from multiple data sources. Transaction pair records are generated from the raw transaction records. Location and entity fields including raw information are identified from the transaction pair records. The raw location and entity information is resolved to generate resolved location and entity information capable of aggregation and further processing, such as the deriving of analytics.

13 Claims, 18 Drawing Sheets

FIGURE 3

| Info Category | Field | Destination Side Value | Source Side Value |
|---|---|---|---|
| transaction | Business Date | 08-AUG-13 | 08-AUG-13 |
| transaction | Value Date | 08-AUG-13 | 08-AUG-13 |
| transaction | Transaction Date | 08-AUG-13 | 08-AUG-13 |
| transaction | Transaction ID | 0123456789AB | 0123456789AB |
| transaction | Transaction Amount | 12345.67 | 12345.67 |
| transaction | Payment Method | BT | BT |
| transaction | Debit Credit Indicator | C | D |
| transaction | Pay Credit Indication | C | P |
| transaction | Transaction Classification Desc | Example Classification | Example Classification |
| transaction | Source ID | | |
| transaction | Local Currency Name | US DOLLARS | US DOLLARS |
| transaction | SYS ID | XYZ | XYZ |
| transaction | Category | C11 | D11 |
| transaction | Bety | N | N |
| transaction | Message Type | 103 | 103 |
| customer | Customer CAS ID | 999999999 | 999999999 |
| customer | Customer Name | EXAMPLE BANK PLC | EXAMPLE ENTITY |
| customer | Customer Region Description | EUROPE, MIDDLE EAST, AFRICA | EUROPE, MIDDLE EAST, AFRICA |
| customer | Customer LOB Group Description | INVESTMENT BANK | INVESTMENT BANK |
| customer | Customer LOB Owner Description | CAPITAL MARKETS | CAPITAL MARKETS |
| customer | Customer City | CITY 1 | CITY 2 |
| customer | Customer State | | |
| customer | Customer Country Name | COUNTRY 1A | COUNTRY2 |
| customer | Customer Country Region | EUR | EUR |
| customer | Ult Parent ECI ID | 888888888 | 777777777 |
| customer | Ult Parent ECS Legal Name | EXAMPLE HOLDINGS PLC | EXAMPLE ENTITY |
| customer | Ult Parent Legal Name | EXAMPLE HOLDINGS PLC | EXAMPLE ENTITY |
| customer | Ultimate Parent C&S | 888888888 | 777777777 |
| account | Account Number | 000000123456789 | 000009876543210 |
| account | Account Name | EXAMPLE BANK PLC | EXAMPLE ENTITY |
| account | Account LOB Group Description | INVESTMENT BANK | INVESTMENT BANK |
| account | Account LOB Owner Description | CAPITAL MARKETS | CAPITAL MARKETS |
| txn_detail | Ult Bene Domicile Desc1 | COUNTRY 1B | COUNTRY 1B |
| txn_detail | Ult Bene Domicile Desc 2 | COUNTRY 2 | COUNTRY 2 |
| txn_detail | Ord Bank 1 | | |
| txn_detail | Ord Bank 2 | | |
| txn_detail | Ord Bank 3 | | |
| txn_detail | Ord Bank 4 | | |
| txn_detail | Ord Bank 5 | | |
| txn_detail | Ord Bank 6 | | |
| txn_detail | Ord Bank 7 | | |
| txn_detail | Ord Cust 1 | /xx12abc0123456789 | /xx12abc0123456789 |
| txn_detail | Ord Cust 2 | 1/1 N.F.O. EXAMPLE B.V. | 1/1 N.F.O. EXAMPLE B.V. |
| txn_detail | Ord Cust 3 | 2/PO BOX 123 | 2/PO BOX 123 |
| txn_detail | Ord Cust 4 | 3/COUTNRY 1B/CODE 2 | 3/COUNTRY 1B/CODE 2 |
| txn_detail | Ord Cust 5 | | |
| txn_detail | Ord Cust 6 | | |
| txn_detail | Ord Cust 7 | | |
| txn_detail | Ord Cust 8 | | |
| txn_detail | Dr id | 1234567890000 | 1234567890000 |
| txn_detail | Dr Ref | XY181818181818 | XY181818181818 |
| txn_detail | Dr Retail | B | B |
| txn_detail | Dr Addr1 | EXAMPLE ENTITY | EXAMPLE ENTITY |
| txn_detail | Dr Addr2 | SOMESTREET 12 6432 | SOMESTREET 12 6432 |
| txn_detail | Dr Addr3 | CITY2 COUNTRY 2 0000 | CITY 2 COUNTRY2 0000 |
| txn_detail | Dr Addr4 | | |
| txn_detail | Dr Addr 5 | | |
| txn_detail | Dr Addr 6 | | |
| txn_detail | Dr Addr 7 | | |

FIGURE 4

|    | Decision | Name | SW Score | Log likelihood ratio of SW |
|----|----------|------|----------|----------------------------|
| Query |  | EXAMPLE BANK PLC |  |  |
| 1  | mismatch | EXAMPLE BANK OMAN SAOG – KARACHI | 0.34796 | -0.81321 |
| 2  | mismatch | EXAMPLE BANK (PANAMA) S.A. | 0.42698 | 2.00657 |
| 3  | match | EXAMPLE BANK PLC | 0.86713 | 4.87622 |
| 4  | match |  | 0.86713 | 4.87622 |
| 5  | match |  | 0.86713 | 4.87722 |
| 6  | mismatch | EXAMPLE BANK PLC AS TRUSTEE OF THE STATE STREET ******* FUND | 0.20488 | -7.63766 |
| 7  | mismatch | EXAMPLE BANK PLC JOHANNESBURG (RINGEFENCED) | 0.41935 | -0.81321 |
| 8  | mismatch | EXAMPLE BANK PLC – LONDON – PB USE | 0.24589 | -7.25203 |
| 9  | mismatch | EXAMPLE BANK PCL – PB-G** MASTER FUND LTD | 0.62190 | 5.60600 |
| 10 | mismatch | EXAMPLE BANK PLC-PB-G ** FUND LTD | 0.45213 | 3.62512 |
| 11 | match | EXAMPLE BANK PLC-ATHENS | 0.28674 | 4.60612 |
| 12 | match | EXAMPLE BANK PLC – HONG KONG | 0.29745 | 2.00647 |
| 13 | match | EXAMPLE BANK PLC – MADRID | 0.89234 | 4.82033 |
| 14 | match | EXAMPLE BANK PLC – MILAN | 0.63622 | 2.19711 |
| 15 | match | EXAMPLE BANK PLC – NEW YORK | 0.45890 | 2.19711 |
| 16 | match | EXAMPLE BANK PLC - PARIS | 0.58902 | -0.13899 |
| 17 | match | EXAMPLE BANK PLC - PRAGUE | 0.38000 | 2.69001 |
| 18 | match | EXAMPLE BANK PLC - SINGAPORE | 0.49048 | 7.32413 |
| 19 | mismatch | EXAMPLE BANK (RR) LLC | 0.48912 | 5.90267 |
| 20 | mismatch | EXAMPLE BANK (TAIWAN) LIMITED | 0.93756 | -7.8344 |
| 21 | mismatch | EXAMPLE BANK (URUGUAY) SA | 0.21874 | 3.90045 |
| 22 | match | EXAMPLE BANK USA | 0.40083 | 6.04512 |
| 23 | match | EXAMPLE BANK USA | 0.28888 | 3.89002 |
| 24 | mismatch | EXAMPLE BANK USA, N.A. | 0.50267 | 4.90233 |
| 25 | mismatch | EXAMPLE BANK USA, N.A. | 0.40634 | -1.89022 |
| 26 | mismatch | EXAMPLE BANK USA, N.A. AS TRUSTEE | 0.50267 | 7.34433 |
| 27 | mismatch | EXAMPLE BANK USA NA – COLLATERAL MANAGEMENT GROUP | 0.29979 | 6.00234 |
| 28 | mismatch | EXAMPLE BANK USA NA LONDON BRANCH | 0.23617 | -7.53766 |
| 29 | mismatch | EXAMPLE BANK USA NATIONAL ASSOCIATION | 0.33155 | -0.81321 |
| 30 | mismatch | EXAMPLE BANK USA NATIONAL ASSOCIATION | 0.33155 | -0.81321 |
| 31 | mismatch | EXAMPLE BANK USA NATIONAL ASSOCIATION | 0.33155 | -0.81321 |

FIGURE 5

| | Decision | Name Tokens | Jaccard distance | Log likelihood ratio |
|---|---|---|---|---|
| Query | | ["EXAMPLE", "BANK", "PLC"] | | |
| 1 | mismatch | ["EXAMPLE", "BANK", "OMAN", "SAOG", "KARACHI"] | 0.34796 | 0.81321 |
| 2 | mismatch | ["EXAMPLE", "BANK", "PANAMA", "S", "A"] | 0.42698 | 2.00657 |
| DE | match | ["EXAMPLE", "BANK", "PLC"] | 0.86713 | 4.87622 |
| 4 | match | | 0.86713 | 4.87622 |
| 5 | match | | 0.86713 | 4.87722 |
| 6 | mismatch | ["EXAMPLE", "BANK", "PLC", "AS", "TRUSTEE", "OF", "THE", "STATE", "STREET", "********", "FUND"] | 0.20488 | 7.63766 |
| 7 | mismatch | ["EXAMPLE", "BANK", "PLC", "JOHANNESBURG", "RINGEFENCED"] | 0.41935 | 0.81321 |
| 8 | mismatch | ["EXAMPLE", "BANK", "PLC", "LONDON", "PB", "USE"] | 0.24589 | 7.25203 |
| 9 | mismatch | ["EXAMPLE", "BANK", "PCL", "PB", "G**", "MASTER", "FUND", "LTD"] | 0.62190 | 5.60600 |
| 10 | mismatch | ["EXAMPLE", "BANK", "PLC", "PB", "G**", "FUND", "LTD"] | 0.45213 | 3.62512 |
| 11 | match | ["EXAMPLE", "BANK", "PLC", "ATHENS"] | 0.28674 | 4.60612 |
| 12 | match | ["EXAMPLE", "BANK", "PLC", "HONG", "KONG"] | 0.29745 | 2.00647 |
| 13 | match | ["EXAMPLE", "BANK", "PLC", "MADRID"] | 0.89234 | 4.82033 |
| 14 | match | ["EXAMPLE", "BANK", "PLC", "MILAN"] | 0.63622 | 2.19711 |
| 15 | match | ["EXAMPLE", "BANK", "PLC", "NEW", "YORK"] | 0.45890 | 2.19711 |
| 16 | match | ["EXAMPLE", "BANK", "PLC", "PARIS"] | 0.58902 | 0.13899 |
| 17 | match | ["EXAMPLE", "BANK", "PLC", "PRAGUE"] | 0.38000 | 2.69001 |
| 18 | match | ["EXAMPLE", "BANK", "PLC", "SINGAPORE"] | 0.49048 | 7.32413 |
| 19 | mismatch | ["EXAMPLE", "BANK," "RR", "LLC"] | 0.48912 | 5.90267 |
| 20 | mismatch | ["EXAMPLE", "BANK", "TAIWAN", "LIMITED"] | 0.93756 | 7.8344 |
| 21 | mismatch | ["EXAMPLE", "BANK", "URUGUAY", "SA"] | 0.21874 | 3.90045 |
| 22 | match | ["EXAMPLE", "BANK", "USA"] | 0.40083 | 6.04512 |
| 23 | match | ["EXAMPLE", "BANK", "USA"] | 0.28888 | 3.89002 |
| 24 | mismatch | ["EXAMPLE", "BANK", "USA", "N", "A"] | 0.50267 | 4.90233 |
| 25 | mismatch | ["EXAMPLE", "BANK", "USA", "N", "A"] | 0.40634 | 1.89022 |
| 26 | mismatch | ["EXAMPLE", "BANK", "USA", "N", "A" "AS", "TRUSTEE"] | 0.50267 | 7.34433 |
| 27 | mismatch | ["EXAMPLE", "BANK", "USA", "N", "A", "COLLATERAL", "MANAGEMENT," "GROUP"] | 0.29979 | 6.00234 |
| 28 | mismatch | ["EXAMPLE," "BANK", "USA", "N", "A", "LONDON" "BRANCH"] | 0.23617 | 7.53766 |
| 29 | mismatch | ["EXAMPLE", "BANK", "USA", "NATIONAL", "ASSOCIATION"] | 0.33155 | 0.81321 |
| 30 | mismatch | ["EXAMPLE", "BANK", "USA", "NATIONAL", "ASSOCIATION"] | 0.33155 | 0.81321 |
| 31 | mismatch | ["EXAMPLE", "BANK", "USA", "NATIONAL", "ASSOCIATION"] | 0.33155 | 0.81321 |

FIGURE 6

| Candidate | City ????? | Country ????? | Loc tokens ????? | Name (SW) ????? | Name tokens (Jaccard) ????? | Sum of ????? | Overall LR | Prior Ratio | Score | Decision |
|---|---|---|---|---|---|---|---|---|---|---|
| 1 | -2.539 | -2.894 | -0.513 | -0.813 | 2.742 | -4.016 | 0.016 | 2.030 | 0.009 | mismatch |
| 2 | -2.539 | -2.894 | -0.513 | 2.007 | 0.455 | -3.484 | 0.031 | 2.030 | 0.015 | mismatch |
| 3 | -2.539 | -2.894 | -0.513 | 4.876 | 5.039 | 3.970 | 52.991 | 2.030 | 0.963 | match |
| 4 | -2.539 | -2.894 | -0.513 | 4.876 | 5.039 | 3.970 | 52.991 | 2.030 | 0.963 | match |
| 5 | -2.539 | -2.894 | -0.513 | 4.876 | 5.039 | 3.970 | 0.000 | 2.030 | 0.963 | match |
| 6 | -2.539 | -2.894 | -0.513 | -7.538 | 0.455 | -13.028 | 0.093 | 2.030 | 0.000 | mismatch |
| 7 | -2.539 | -2.894 | -0.513 | -0.813 | 4.385 | -2.373 | 0.093 | 2.030 | 0.044 | mismatch |
| 8 | -2.539 | -2.894 | -0.513 | -0.813 | 4.385 | -2.373 | 0.093 | 2.030 | 0.044 | mismatch |
| 9 | -2.539 | -2.894 | -0.513 | -7.538 | 2.742 | -10.741 | 0.000 | 2.030 | 0.000 | mismatch |
| 10 | -2.539 | -2.894 | -0.513 | -7.538 | 2.742 | -10.741 | 0.000 | 2.030 | 0.000 | mismatch |
| 11 | -2.539 | -2.894 | -0.513 | 3.625 | 4.418 | 2.087 | 8.154 | 2.030 | 0.801 | match |
| 12 | -2.539 | -2.894 | -0.513 | 3.625 | 4.418 | 1.609 | 4.998 | 2.030 | 0.711 | match |
| 13 | -2.539 | -2.894 | -0.513 | 3.625 | 3.929 | 2.098 | 8.154 | 2.030 | 0.801 | match |
| 14 | -2.539 | -2.894 | -0.513 | 4.806 | 4.418 | 3.079 | 21.740 | 2.030 | 0.915 | match |
| 15 | -2.539 | -2.894 | -0.513 | 3.625 | 4.418 | 1.609 | 4.998 | 2.030 | 0.711 | match |
| 16 | -2.539 | -2.894 | -0.513 | 4.606 | 4.418 | 2.098 | 21.740 | 2.030 | 0.915 | match |
| 17 | -2.539 | -2.894 | -0.513 | 3.625 | 2.742 | 3.079 | 8.154 | 2.030 | 0.711 | match |
| 18 | -2.539 | -2.894 | -0.513 | 3.625 | 2.842 | 1.609 | 8.154 | 2.030 | 0.915 | match |
| 19 | -2.539 | -2.894 | -0.513 | 3.625 | 2.742 | 3.079 | 1.525 | 2.030 | 0.801 | mismatch |
| 20 | -2.539 | -2.894 | -0.513 | -0.813 | 4.390 | 2.098 | 0.018 | 2.030 | 0.429 | mismatch |
| 21 | -2.539 | -2.894 | -0.513 | 2.007 | 4.389 | 0.422 | 0.302 | 2.030 | 0.009 | mismatch |
| 22 | -2.539 | -2.894 | -0.513 | 4.606 | 0.455 | -4.016 | 21.040 | 2.030 | 0.130 | match |
| 23 | -2.539 | -2.894 | -0.513 | 4.606 | 2.742 | -1.197 | 21.040 | 2.030 | 0.912 | match |
| 24 | -2.539 | -2.894 | -0.513 | 2.007 | 4.418 | 3.046 | 0.031 | 2.030 | 0.912 | mismatch |
| 25 | -2.539 | -2.894 | -0.513 | 3.625 | 4.418 | 3.046 | 1.525 | 2.030 | 0.015 | mismatch |
| 26 | -2.539 | -2.894 | -0.513 | -0.813 | 4.418 | -3.484 | 0.002 | 2.030 | 0.429 | mismatch |
| 27 | -2.539 | -2.894 | -0.513 | -7.538 | 3.929 | 0.422 | 0.000 | 2.030 | 0.001 | mismatch |
| 28 | -2.539 | -2.894 | -0.513 | 0.455 | 5.039 | -6.303 | 0.002 | 2.030 | 0.000 | mismatch |
| 29 | -2.539 | -2.894 | -0.513 | 0.455 | 4.48 | -4.016 | 0.018 | 2.030 | 0.001 | mismatch |
| 30 | -2.539 | -2.894 | -0.513 | 2.742 | 0.455 | -4.016 | 0.018 | 2.030 | 0.009 | mismatch |
| 31 | -2.539 | -2.894 | -0.513 | 2.742 | 2.742 | -4.016 | 0.018 | 2.030 | 0.009 | mismatch |

FIGURE 8: Jaccard Distance (string similarity)
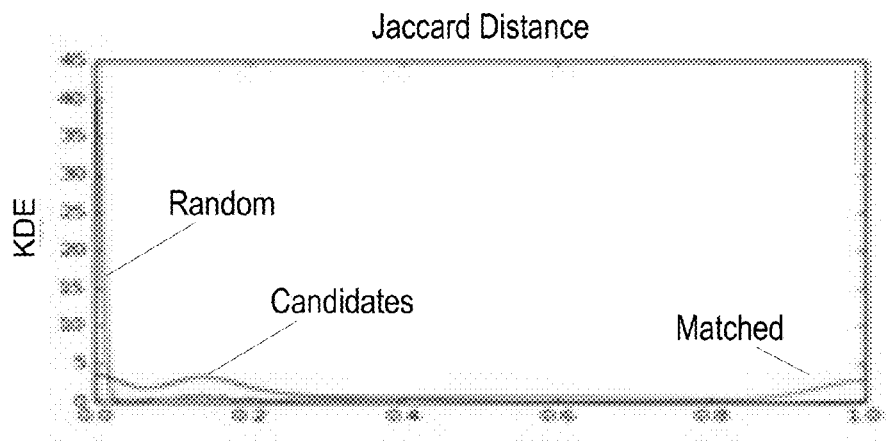
FIGURE 9: Character 2-gram (query-weighted)
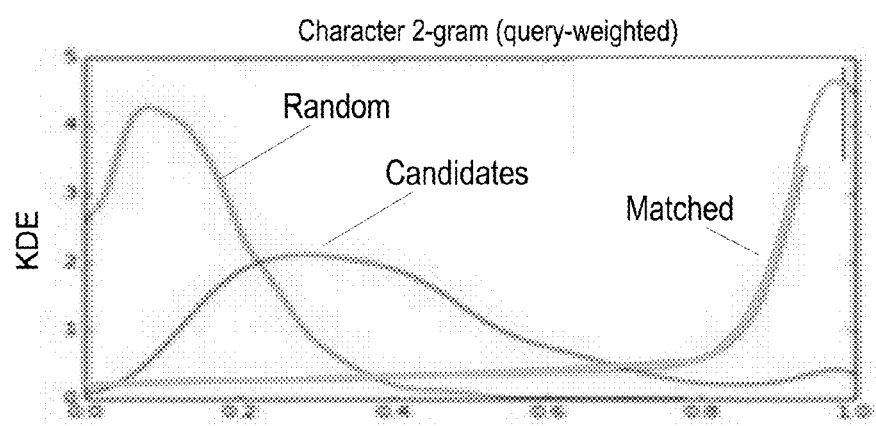
FIGURE 10: Character 4-gram (average-weighted)
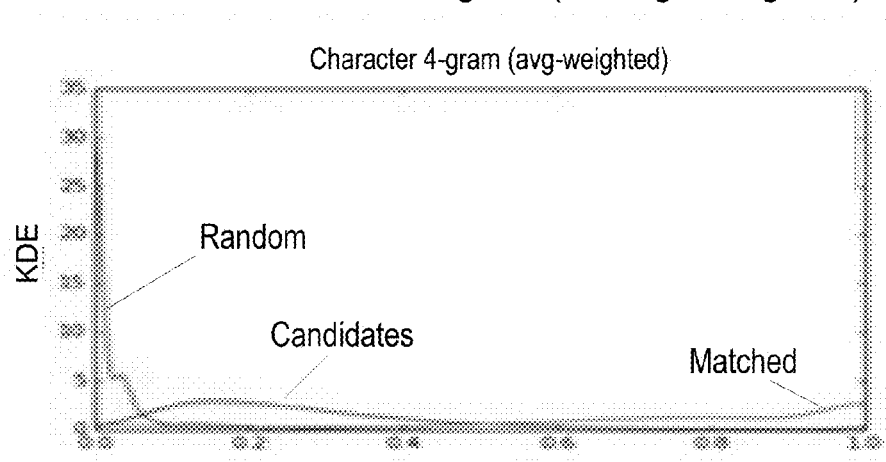

FIGURE 11: Common Initials
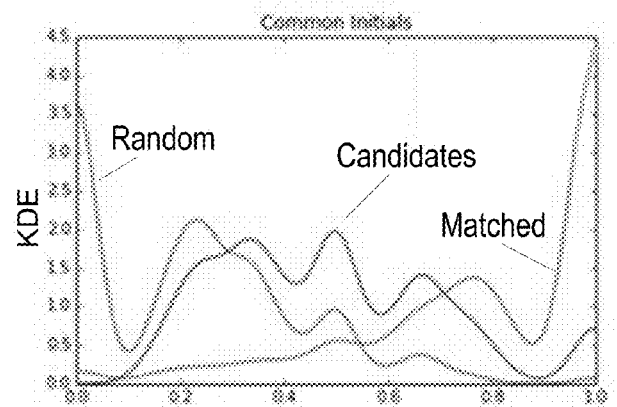
FIGURE 12: Jaro-Winkler string similarity
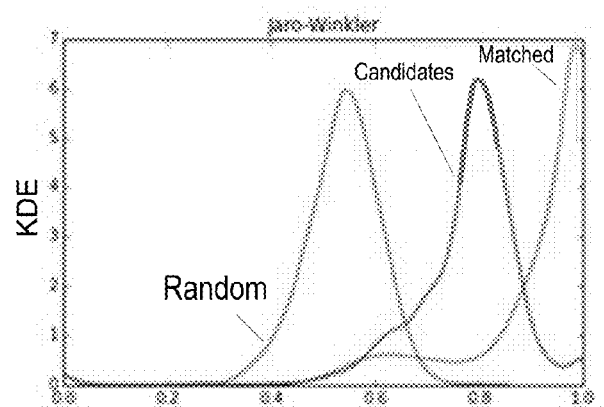
FIGURE 13: Seqmatch string similarity
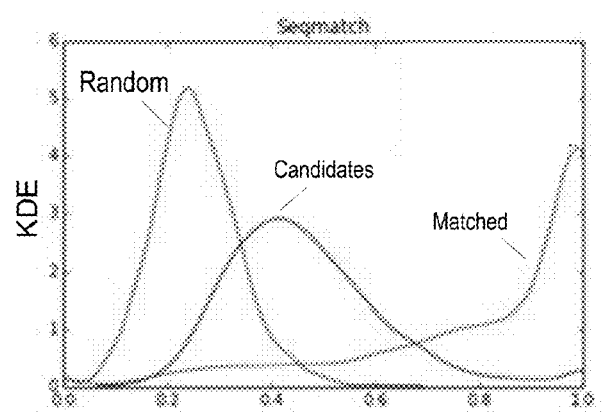

FIGURE 14: City Match
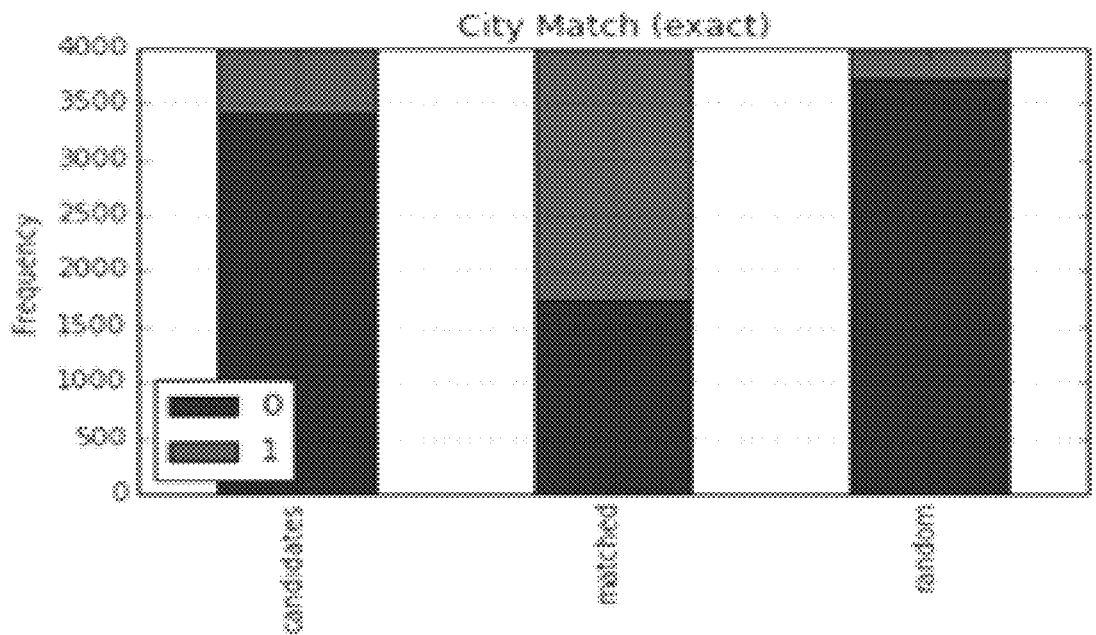
FIGURE 15: Country Match
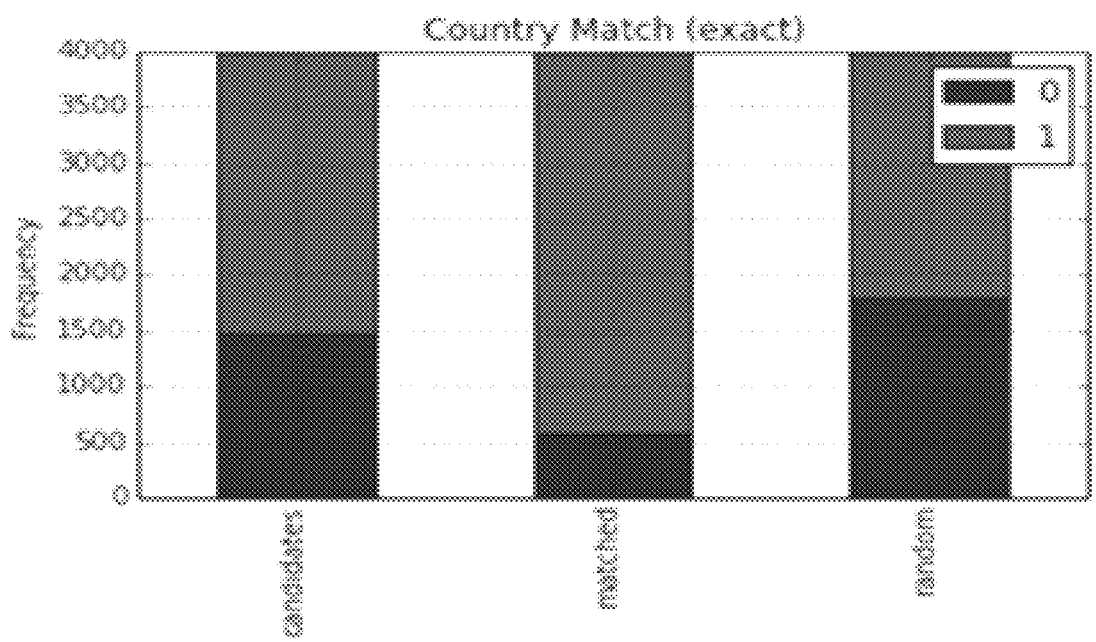

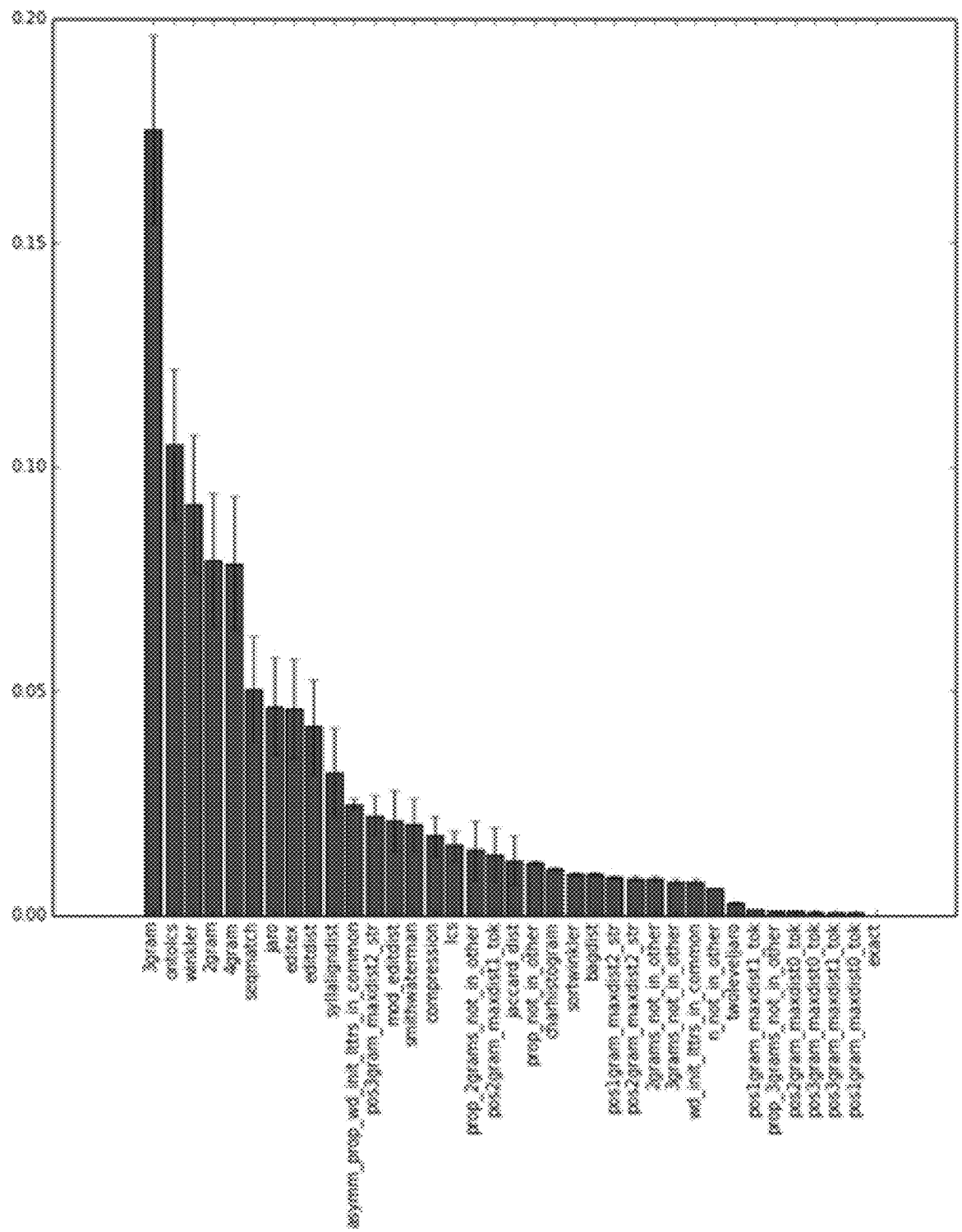
FIGURE 16: Feature importance scores from Random Forest Classifier

FIGURE 17: Entity Resolver with Naïve Bayes Classifier
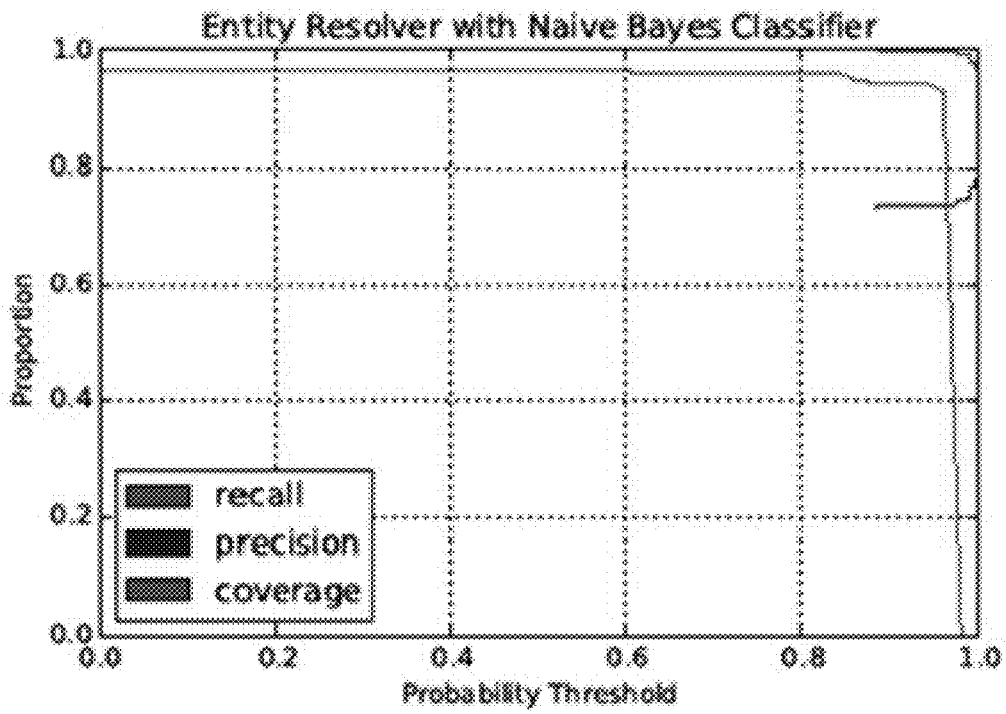
FIGURE 18: Entity Resolver with Logistic Regression Classifier
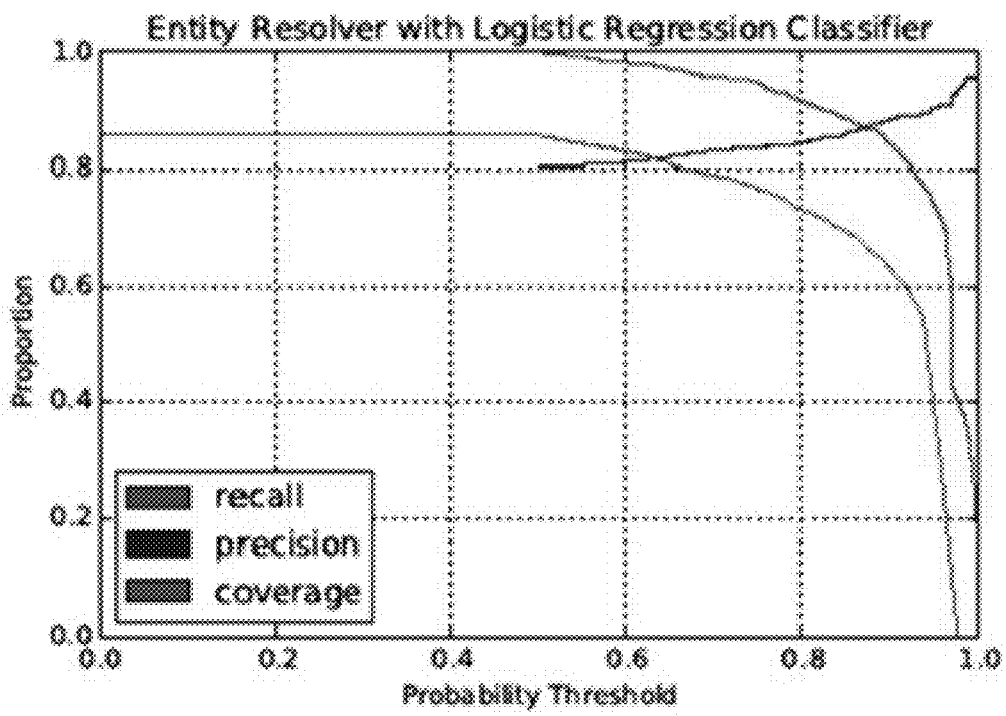

| Side | Depth (Distance from center) | Transaction Entities Resolved |
|---|---|---|
| Debit | 3 | 47% |
| Debit | 2 | 80% |
| Debit | 1 | 78% |
| Credit | 1 | 73% |
| Credit | 2 | 55% |
| Credit | 3 | 52% |
| Credit | 4 | 15% |

FIGURE 20: Accuracy of Location Resolution of City

FIGURE 21: Accuracy of Location Resolution of Country
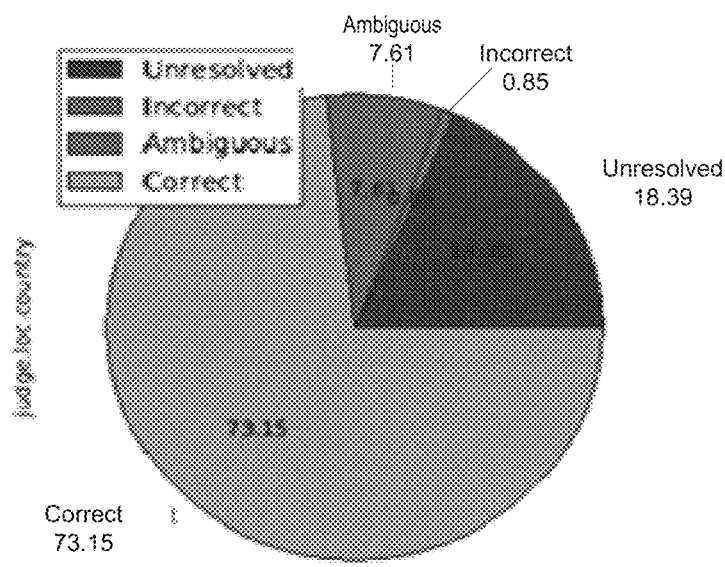
FIGURE 22: Accuracy of Location Resolution of State
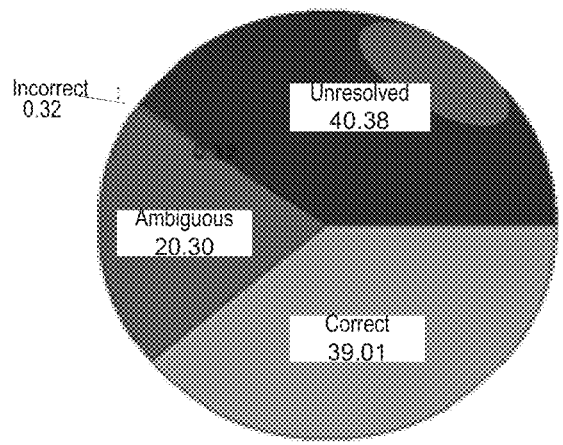

FIGURE 23: List of String Similarity Measures Tested for Entity Resolution

| Abbreviation | String Similarity Measure Name |
| --- | --- |
| 2gram | 2-gram |
| 2grams_not_in_other | Number of 2-grams not in candidate |
| 3gram | 3-grams |
| 3grams_not_in_other | Number of 3-grams not in candidate |
| 4gram | 4-grams |
| asymm_prop_wd_init_ltrs_in_common | Proportion Common Initials (query-weighted) |
| bagdist | Bag Distance |
| charhistogram | Cosine similarity of character frequencies |
| compression | Comparison of Compression based on Zlib |
| editdist | Edit Distance (Levenshtein Distance) |
| editex | Phonetically aware edit-distance (Zobel et al. 1996) |
| exact | Exact String Match |
| jaccard_dist | Jaccard Distance |
| jaro | Jaro |
| lcs | Longest Common Substring |
| mod_editdist | Modified Edit Distance (transposition cost = 1 |
| n_not_in_other | Characters that are in query and not in candidate |
| ontolcs | Ontology Longest Common Substring |
| pos1gram_maxdist0_tok | Positional token 1-grams, must match position exactly |
| pos1gram_maxdist1_tok | Positional token 1-grams, max offset=1 |
| pos1gram_maxdist2_str | Positional character 1-grams, max offset=2 |
| pos2gram_maxdist0_tok | Positional token 2-grams, must match position exactly |
| pos2gram_maxdist1_tok | Positional token 2-grams, max offset=1 |
| pos2gram_maxdist2_str | Position character 2-grams, max offset=2 |
| pos3gram_maxdist0_tok | Positional token 3-grams, must match position exactly |
| pos3gram_maxdist1_tok | Positional token 3-grams, max offset=1 |
| pos3gram_maxdist2_str | Positional character 3-grams, max offset=2 |
| prop_2grams_not_in_other | Ratio of token 2-grams only in query to total number of n-grams in both query and candidate |
| prop_3grams_not_in_other | Ratio of token 3-grams only in query to total number of n-grams in both query and candidate |
| prop_not_in_other | Ratio of tokens only in query to total number tokens in query |
| seqmatch | Sequence Match |
| smithwaterman | Smith-Waterman Similarity |
| sortwinkler | Jaro-Winkler, using sorted words |
| syllaligndist | Syllable Alignment Distance |
| twoleveljaro | Two-Level Jaro string similarity |
| wd_init_ltrs_in_common | Common Initials (count) |
| winkler | Jaro-Winkler |

FIGURE 24: Candidates for example of resolving using Logistic Regression classifier

| ID | Candidate Name | Country | City |
|---|---|---|---|
| 1 | EXAMPLE, IX, INC. | UNITED STATES | DETROIT |
| 2 | EXAMPLE V, INC | UNITED STATES | WESTLAND |
| 3 | EXAMPLE VIII, INC. | UNITED STATES | DETROIT |
| 4 | EXAMPLE X, INC. | UNITED STATES | DETROIT |
| 5 | EXAMPLE XI, INC. | UNITED STATES | DETROIT |
| 6 | EXAMPLE XII, INC. | UNITED STATES | DETROIT |
| 7 | EXAM INVESTMENTS, LP | UNITED STATES | EL PASO |
| 8 | EXMP LTD | UNITED STATES | SCOTTSDALE |
| 9 | EXMPL ASSOCIATES ID B A EXMP TRUST D\B\A S******* INVESTMENT TRUSTS | UNITED STATES | CHICAGO |
| 10 | EXMPL HOLDINGS INC | UNITED STATES | AMITYVILLE |
| 11 | EXMPLE AND SAMPLE BANK LIMITED | INDIA | MUMBAI |
| 12 | EXMPLES ACQUISITION LLC | UNITED STATES | INDIANAPOLIS |
| 13 | EXMPLES CHINA LTD | HONG KONG | HONG KONG |
| 14 | EXMPLES NURSERY INC | UNITED STATES | MENLO PARK |
| 15 | EXMPLES 2 REALTY LLC | UNITED STATES | BROOKLYN |
| 16 | EXMPLES US INC | UNITED STATES | INDIANAPOLIS |
| 17 | EXMPLS LLC | UNITED STATES | CROWN POINT |
| 18 | EXMPLS PROPERTIES LLC | UNITED STATES | SAN DIEGO |
| 19 | EXMPLS, INC. | UNITED STATES | BETHLEHEM |
| 20 | EXMPLS DEVELOPMENT CORPORATION | UNITED STATES | RAMSEY |
| 21 | EXMPLS MEDIA LLC | UNITED STATES | LAPEER |

FIGURE 25: Feature values and scores when comparing the candidate entities to raw entity information in the example of resolving using a Logistic Regression classifier

| Cand. ID | Intercept | Jaccard | 2-gram | 4-gram | Common Initials | Jaro-Winkler | Seqmatch | city | country | score |
|---|---|---|---|---|---|---|---|---|---|---|
| 1 | 1 | 0.0000 | 0.0645 | 0.0000 | 0.1667 | 0.4796 | 0.2917 | 0 | 0 | 0.0298 |
| 2 | 1 | 0.0000 | 0.0968 | 0.0000 | 0.1667 | 0.5333 | 0.3556 | 0 | 0 | 0.0235 |
| 3 | 1 | 0.0000 | 0.0968 | 0.0000 | 0.1667 | 0.4699 | 0.3265 | 0 | 0 | 0.0348 |
| 4 | 1 | 0.0000 | 0.0968 | 0.0000 | 0.1667 | 0.5194 | 0.3478 | 0 | 0 | 0.0256 |
| 5 | 1 | 0.0000 | 0.0968 | 0.0000 | 0.1667 | 0.4905 | 0.3404 | 0 | 0 | 0.0307 |
| 6 | 1 | 0.0000 | 0.0968 | 0.0000 | 0.1667 | 0.4796 | 0.3333 | 0 | 0 | 0.0328 |
| 7 | 1 | 0.0000 | 0.1290 | 0.0000 | 0.3333 | 0.5833 | 0.2400 | 0 | 0 | 0.0186 |
| 8 | 1 | 0.1429 | 0.1935 | 0.1818 | 0.3333 | 0.5111 | 0.3684 | 0 | 0 | 0.1123 |
| 9 | 1 | 0.0000 | 0.3226 | 0.0396 | 0.6667 | 0.5889 | 0.3158 | 0 | 0 | 0.0397 |
| 10 | 1 | 0.0000 | 0.0968 | 0.0377 | 0.1667 | 0.5631 | 0.3617 | 0 | 0 | 0.0222 |
| 11 | 1 | 0.5714 | 0.7742 | 0.6667 | 0.8333 | 0.7637 | 0.8667 | 0 | 1 | 0.8922 |
| 12 | 1 | 0.0000 | 0.1290 | 0.0000 | 0.5000 | 0.5278 | 0.3400 | 0 | 0 | 0.0310 |
| 13 | 1 | 0.1250 | 0.1935 | 0.1600 | 0.3333 | 0.5659 | 0.4545 | 0 | 0 | 0.0742 |
| 14 | 1 | 0.0000 | 0.0645 | 0.0000 | 0.1667 | 0.5778 | 0.3043 | 0 | 0 | 0.0159 |
| 15 | 1 | 0.0000 | 0.1290 | 0.0000 | 0.3333 | 0.5349 | 0.3404 | 0 | 0 | 0.0271 |
| 16 | 1 | 0.0000 | 0.0645 | 0.0000 | 0.1667 | 0.5579 | 0.3171 | 0 | 0 | 0.0182 |
| 17 | 1 | 0.0000 | 0.0968 | 0.0000 | 0.3333 | 0.3593 | 0.2564 | 0 | 0 | 0.0733 |
| 18 | 1 | 0.0000 | 0.1290 | 0.0000 | 0.3333 | 0.4970 | 0.2857 | 0 | 0 | 0.0335 |
| 19 | 1 | 0.0000 | 0.0645 | 0.0000 | 0.1667 | 0.4627 | 0.2619 | 0 | 0 | 0.0326 |
| 20 | 1 | 0.0000 | 0.0645 | 0.0000 | 0.1667 | 0.5230 | 0.2241 | 0 | 0 | 0.0216 |
| 21 | 1 | 0.0000 | 0.0968 | 0.0000 | 0.3333 | 0.5659 | 0.3409 | 0 | 0 | 0.0206 |

DATA EXTRACTION AND TRANSFORMATION METHOD AND SYSTEM

TECHNICAL FIELD

Embodiments of the present disclosure relate generally to data management, and, more specifically, to a system and corresponding methods for data extraction, mining, visualization and determining analytics relating to information from diverse financial and transactional data sources.

BACKGROUND

Many financial and transactional systems receive and process raw data from multiple and disparate data sources. In many instances, the raw data is processed in a centralized manner which is faced with ambiguities in the unstructured and heterogeneous data. Due to the inconsistencies and variety in the various structures of the raw data, exploration and analysis of the data to derive analytics is limited.

BRIEF DESCRIPTION OF THE DRAWINGS

The present invention is illustrated by way of example, and not by way of limitation, and will become apparent upon consideration of the following detailed description, taken in conjunction with the accompanying drawings, in which like reference characters refer to like parts throughout, and in which:

FIG. 3 illustrates a table including exemplary transaction pairs, according to embodiments of the present disclosure.

FIGS. 4 and 5 illustrate tables including exemplary name pair scores by measure, according to embodiments of the present disclosure.

FIG. 6 is a table including exemplary pair matching scores, according to embodiments of the present disclosure.

FIGS. 8 through 13 show the distribution of feature scores as a kernel density estimate for three kinds of candidate pairings: true matches (green, "matched"), random pairings (red, "random"), and pairings between candidates that have similar prefixes (blue, "candidates")

FIGS. 14 and 15 show the frequency of match status (green in color) versus non-match status (blue in color) in sample comparisons between pairs of locations that are "candidates" (i.e., similar), "matched" (i.e., equivalent), and "random" (i.e., randomly paired, unlikely to be a match).

FIG. 16 shows string feature importance scores based on a Random Forest Classifier. FIG. 23 is a table that describes the abbreviations for the features as displayed in FIG. 16.

FIGS. 17 and 18 show precision, recall, and coverage measures for an Entity Resolver using a Naïve Bayes Classifier (in FIG. 17) and an Entity Resolver using a Logistic Regression Classifier (in FIG. 18).

FIGS. 20 through 22 show the accuracy of a location resolver for city, country, and state information.

FIG. 23 shows a list of string similarity measures that were tested for use in an implementation of Entity Resolution. The abbreviations in FIG. 23 correspond to the abbreviations used in FIG. 16.

FIG. 24 shows candidate entities that were retrieved during candidate lookup for an example of resolving using a Logistic Regression classifier.

FIG. 25 shows the feature values and scores when comparing the candidate entities to the raw entity (i.e., "query") information in the example of resolving using a Logistic Regression classifier.

DETAILED DESCRIPTION

The present disclosure provides for systems and methods for processing raw transaction records received from multiple data sources. According to embodiments of the present disclosure, the received raw transaction records have heterogeneous field structures and field information. The raw transaction records are processed and filtered to identify and generate transaction pair records. Transaction pair records include two or more records which are related to one another. For example, a transaction pair record may include a "sell" transaction and a corresponding "buy" transaction. In an embodiment of the present disclosure, the underlying transaction records of the transaction pair record may be derived from multiple different data sources or the same data source.

According to embodiments of the present disclosure, in order to identify potential relationships between the entities involved in a transaction, selected fields are identified from the transaction pair records. In an embodiment, one or more "location" fields are identified. A location field includes, but is not limited to, any one or more fields in a transaction record (e.g., either a raw record or a transaction pair record) which includes information relating to a geographic location associated with an entity. For example, the location field may include any field having a street address, city, state, zip code, country, etc. associated with a party or entity involved in a transaction.

According to an embodiment of the present disclosure, one or more "entity" fields are identified from the transaction pair records. In an embodiment, an entity field includes, but is not limited to, any one or more fields in a transaction record (e.g., either a raw record or a transaction pair record) including information suitable for use in identifying an entity or party involved in a transaction, such as, for example, information relating to a name (e.g., a legal name, an affiliate name, a subsidiary name, a DBA, etc.), an identifier, etc.

According to embodiments of the present disclosure, the information included in the identified fields (e.g., the location and entity fields) of the transaction pair record is resolved in order to eliminate or remove ambiguities within the information. The resolved location and entity information including identified entities involved in a transaction may be maintained in a resolved transaction pair record. The resolved transaction pair record may be further processed according to generate various analytics including the identification and visualization of entity relationships (e.g., established transaction-based entity-to-entity links).

Figure 1:
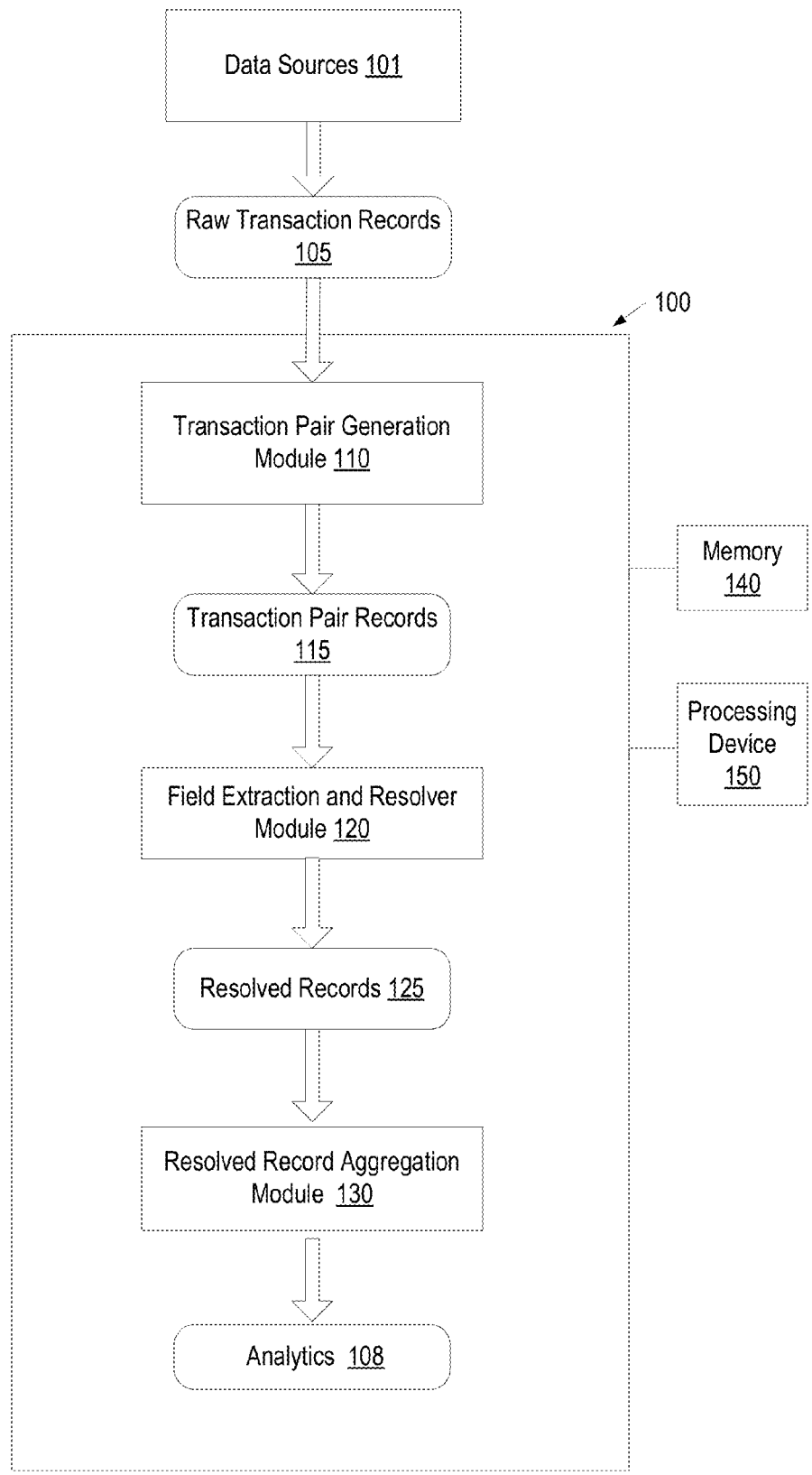
FIG. 1 is a block diagram of an exemplary computing environment including a transactional data resolver component, according to embodiments of the present disclosure.

FIG. 1 is a block diagram illustrating an example transactional data resolution system 100 in communication with multiple data sources 101. In certain implementations, the transactional data resolution system 100 may comprise physical computing systems (e.g., computing devices, servers, etc.) and/or virtual machines configured to perform the methods and operations described herein. In an implementation, the transactional data resolution system 100 includes a transaction pair generation module 110, a field extraction and resolver module 120 and a resolved record aggregation module 130 executed by a processing device 150 and coupled to a memory 140.

According to embodiments of the present disclosure, the transactional data resolution system 100 and modules thereof are software components (e.g., a set of instructions residing in a memory 140) executable by a processing device (e.g., processing device 150) to perform the processing of the raw transaction records 105 received from the data sources 101, as described in greater detail below. Memory 140 may be any suitable computer readable storage medium, including volatile memory devices (e.g., random access memory (RAM)), non-volatile memory devices (e.g., flash memory), a magnetic hard disk, a Universal Serial Bus (USB) solid state drive, etc., a local disk, an external disk, and/or other types of memory devices.

According to embodiments of the present disclosure, the transactional data resolution system 100 may be configured as a single component or any suitable combination of components configured to perform the methods described herein relating to processing and resolving the raw transaction records received from the data sources 101. The data sources may include, but are not limited to, any suitable source of financial, healthcare, or other transactional data. Exemplary data sources 101, according to embodiments of the present disclosure, include, but are not limited to, data of a transactional nature, data from sources that are heterogeneous with respect to format and/or content, data that associate entities with additional information, data that establish relationships between entities, and the like. The data may be internal to a particular organization, may come from an external source or from multiple external sources, or any combination thereof. All of these possible data sources will be referred to as "Data Sources".

In an implementation, the transaction pair generation module 110 is configured to receive the raw transaction records 105 from the multiple data sources 101, identify transaction pairs from the raw transaction records, and generate transaction pair records 115. In an embodiment, the raw transaction records 105 may be first stored in a suitable data store (e.g., memory 140) which is accessible by the transaction pair generation module 110. According to an embodiment of the present disclosure, a transaction pair includes two or more related transactions. The transaction pair associates multiple transactions relating to a common or overarching transaction between a transaction source and transaction destination. The transaction pair may include one or more intermediate transactions relating to the overarching transaction between the transaction source and transaction destination, including intermediate transactions managed by various different data sources 101. In an embodiment, the information included in the raw transaction records associated with the one or more intermediate transactions may not indicate a context or association with the overarching transaction. Advantageously, the transaction pair generation module 110 may link multiple individual transactions that are part of a larger chain of transactions into the one or more transaction pairs of a transaction pair record 115, according to methods described below in detail in connection with FIGS. 2 and 3.

According to embodiments of the present disclosure, the transaction pair records may be provided to the field extraction and resolver module 120. The field extraction and resolver module 120 is configured to identify selected fields from the transaction pair records in order to disambiguate information in the raw transaction records and transaction pair records. In an embodiment, the selected fields may include the location field and the entity field. According to implementations, the field extraction and resolver module 120 resolves the information in the selected fields (e.g., the location and entity fields) of the transaction pair records, as described below in detail in connection with FIGS. 2 and 3.

According to embodiments of the present disclosure, a resolved record 125 may be processed by the resolved record aggregation module 130. In implementations, the resolved record aggregation module 130 is configured to process the resolved records 125 to determine desired analytics 108 including the identification of relationships and associations among the locations, entities, and transactions involved in the multiple transactions which were identified in the resolved transaction pair records. According to implementations, the resolved record aggregation module 130 may be accessible by a user via an Application Programming Interface (API) for running a variety of analytics applications, including, for example, risk analysis applications, scenario modeling applications, and relationship mapping and visualization applications, etc.

According to embodiments of the present disclosure, the transactional data resolution system 100 may communicate with the data sources 101 and the various components of the transactional data resolution system 100 (e.g., the transaction pair generation module 110, the field extraction and resolver module 120, and the resolved record aggregation module 130) may communicate with one another via a network (e.g., a public network such as the Internet, a private network such as a local area network (LAN), or a virtual private network (VPN)). The transactional data resolution system 100 may include one or more executable instructions, programs, and/or hardware configured to perform the methods described in detail herein. The transactional data resolution system 100 may include and/or may be executable by any suitable computing system comprising one or more processing devices (e.g., processing device 150), one or more memory devices (e.g., memory 140), and one or more input/output (I/O) interfaces, such as a server, a workstation, a personal computer (PC), a mobile phone, a palm-sized computing device, a personal digital assistant (PDA), a virtual computing system, etc., such as the exemplary system architecture described below in connection with FIG. 26.

The various components of the transactional data resolution system 100 may reside on different computing devices and may be physically or virtually located in any number of different locations. Accordingly, any desired distributed arrangement of the transactional data resolution system 100 may be achieved.

Figure 2:
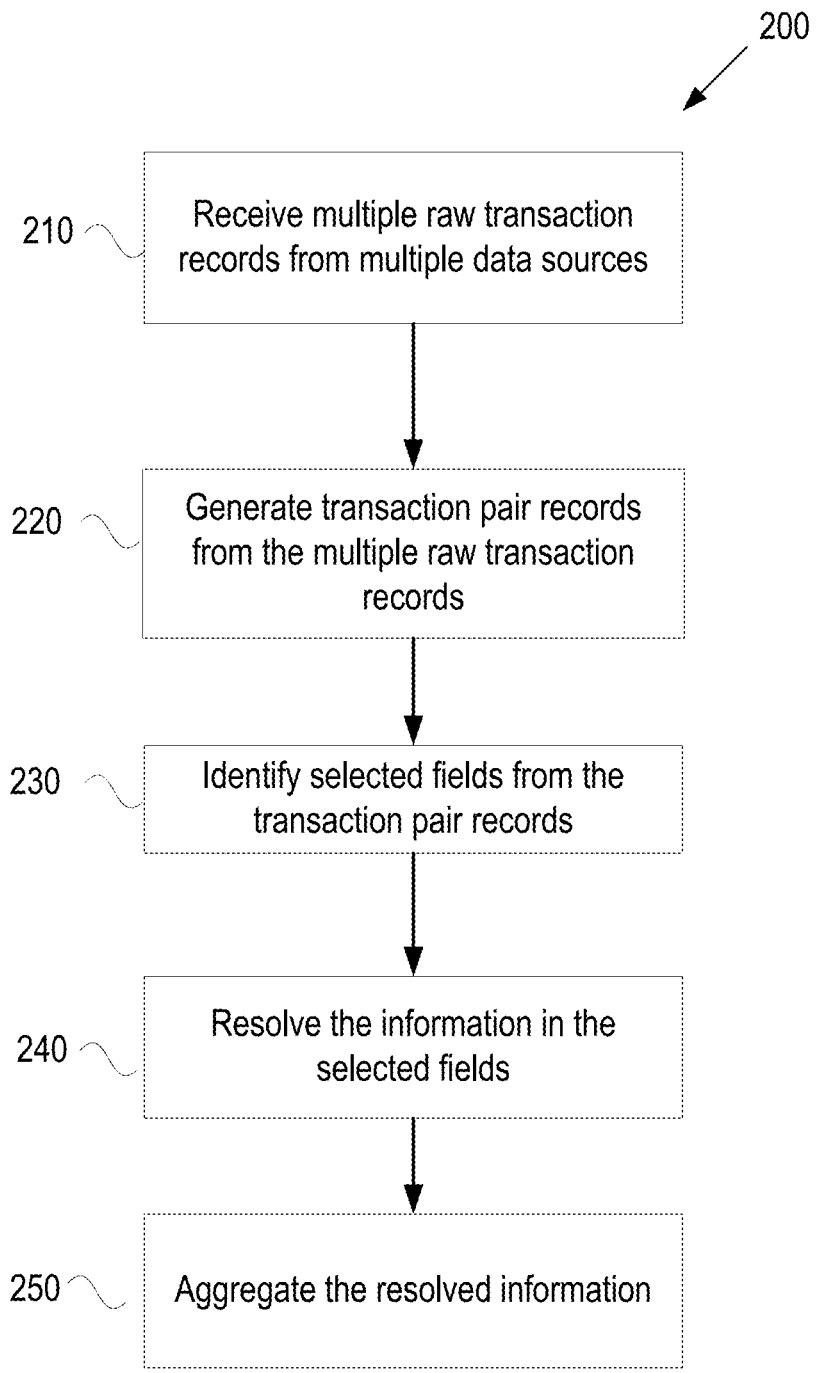
FIG. 2 is a flow diagram of an exemplary method for aggregating resolved transactional data generated from raw transaction records received from multiple data sources, according to embodiments of the present disclosure.

FIG. 2 is a flow diagram illustrating an example of a method 200 for aggregating resolved transaction pair records based on multiple raw transaction records, in accordance with aspects of the present disclosure. In an example, the method 200 may be performed by a computing system (e.g., transactional data resolution system 100 of FIG. 1 or computing system 2600 of FIG. 26) that may include hardware (e.g., circuitry, dedicated logic, programmable logic, microcode, etc.), software (e.g., instructions executed by a processing device), or a combination thereof.

With reference to FIG. 2, in block 210, the transactional data resolution system (e.g., the transaction pair generation module 110 of FIG. 1) receives multiple raw transaction records from multiple data sources (e.g., data sources 101 of FIG. 1). The raw transaction records may be received from a variety of different Data Sources (e.g., transfer data sources, financial transaction sources, financial information sources, healthcare data sources, etc.) in a variety of different formats and structures. Depending on the source of the record, the multiple raw transaction records may include varying fields, field identifiers, field content, field arrangement, etc. In order to produce homogenous records, the heterogeneous information in the raw records is transformed in method 200.

In an embodiment, the data source of the raw record may be considered in determining an appropriate processing methodology in block 210. For example, wire transfer records often pass through various financial institutions in their processing flow from the original source to an ultimate destination. In this regard, records from some set of Data Sources may undergo similar processing in block 210, whereas records from a different set of Data Sources may have a different process involving more elaborate transaction pairing and field identification techniques, as described below.

In block 210, information from the raw transaction records is extracted and configured into a unified format before the transformation and resolution operations are applied (e.g., blocks 220-240). For example, transactions may be extracted and stored in a tabular format in a delimited text file. In an example, the compressed size of one month from a transactional Data Source may be approximately 2 GB. In a record, information from the credit and debit sides of a transaction may be spread over two separate, partially overlapping records.

In block 220, transaction pair records are generated based on the multiple raw transaction records. In an implementation, the transaction pair records may include information from any quantity of related raw transaction records. For example, certain wire transfers often pass through various financial institutions during processing from a original transaction source to a transaction destination. In certain instances, intermediate data sources list the transaction separately, without explicitly indicating that they belong to the same overarching transaction. In order to identify the originating source and the transaction destination, the one or more related intermediate transactions may be linked to establish a complete transaction chain.

In order to establish a complete transaction chain, in block 220, related transactions are paired or associated in order to generate the transaction pair records. It is noted that transaction pair records may link or associate any number of related transactions. For example, a transaction pair record may include two transaction records joined together—a destination side including destination side data from a first data source and a source side including source side data.

In an embodiment, adjacent or related fields with high enough similarity are indexed as part of the same transaction, and roles are assigned (e.g., ultimate source, intermediate source(s), intermediate destination(s), and ultimate destination). In an example, when processing an entire month's worth of raw transaction records in one file, the source and destination sides of the transaction may not be clearly associated with each other. In this example, the transactions may first be sorted (e.g., by date or other identifying field) and assigned as a source or as a destination. In this example, two raw transaction records are joined into one transaction pair record, and the fields are recoded and categorized, as shown in FIG. 3.

In block 230, selected fields in the transaction pair records are identified in order to resolve ambiguities, inconsistencies, errors, and variations in the content of the fields. In an embodiment, the selected fields include the one or more location fields and the one or more entity fields. For example, as shown in FIG. 3, the location and entity information may be distributed and spread over multiple fields in an unstructured format. In this regard, records from a same data source may use one field for entity name information, while other records from the same data source may use the same field for location information (e.g., city, country, etc.). Furthermore, other records from the same data source may use the same field for junk text.

According to embodiments of the present disclosure, the selected fields may be identified on a record-by-record basis using information such as which fields are filled and which are empty, string properties of the text within a field (e.g., ratio of letters to digits), manual labeling, and machine category learning from the manual labels using, for example, a Hidden-Markov model. For example, fields in a transactional record from one Data Source that identify entities may not be consistent across records, but the majority of records from that Data Source may adhere to certain transaction record rules.

According to embodiments of the present disclosure, in block 230, transaction record rules may be applied to identify the selected fields. In embodiments, the transaction record rules may be any defined rules or conditions for processing a raw transaction record. The transaction record rules may be specified based on the associated data source.

In an example transactional record, the following exemplary transaction record rules may be: i) if any of the fields are filled, then the first field is filled, and each subsequent contiguous field is filled until the first field that is blank, after which all of the remaining fields are blank; ii) if the first field contains more numbers than letters, it is a junk field and is ignored; iii) the first field non-empty, non-junk field tends to be name-related and tends to contain the majority—if not all—of the name information; iv) the last filled field of a record tends to contain city, country, and post code information; v) there may be multiple additional fields between the initial name field and the city/country field, but classifying them as name, address, or other information is less predictable than the first and last non-empty, non-junk fields. In this example, the transaction record rules may be applied to identify the selected fields (e.g., at least one location field and at least one entity field).

According to embodiments of the present disclosure, fields beginning with the same character string and consecutive numbering (e.g., "Ord Cust1," "Ord Cust2," "Ord Cust3," etc. of FIG. 3) may be grouped into a field group. A field group may contain information such as a name, city, country, etc. In an embodiment, a field group may map to one entity, which may or may not also be represented in other field groups in the same transaction.

In block 230, in an example, information within the same field may be identified as coherent or related (e.g., "CHI- CAGO IL 60615" is all location-related, whereas a field with "EXAMPLE BANK PLC" would be all entity-related). Accordingly, in block 230, the fields of a raw transaction record are analyzed to identify the name field(s) and the location field(s). In an embodiment, a first non-null, alphabetic field in a field group may be identified as a raw entity name and the last non-null field as a raw location.

According to an embodiment of the present disclosure, in block 230, a Hidden Markov Model (HMM) may be applied. In this embodiment, the HMM may use the transitional probabilities of observable labels in a sequence to learn patterns of unobservable labels. For field identification purposes, each field in a field group may be labeled as "name", "location", "both" or "neither". However, the labels may be identified as unobservable.

In an embodiment, in order to predict the unobservable labels, other labels are needed that may be operationally defined by directly observable features. In an embodiment, the computation of the observable features and the associated labeling may be performed such that all of the fields of all the records contain the observable labels. In an example, potential observable labels for wire transfer field groups may be "blank," "mostly letters," and "mostly numbers".

According to an embodiment of the present disclosure, application of an HMM may include use of a training data sample containing the observable and unobservable labels in order to learn the associations of the transitional probabilities. In an embodiment, a sample of the field groups may be manually labeled as "name" versus "location" information.

With reference to FIG. 2, in block 230, transaction pair records includes identifying selected fields (e.g., name and location fields) in a common format, not tied to the data source formatting. Next, in block 240, the information in the selected fields (e.g., the name and location fields) is resolved. In an embodiment, location resolution (i.e., resolving the location information) and entity resolution (i.e., resolving the entity information) is performed in block 240.

According to implementations, location resolution includes collecting information about countries, cities, states, standard abbreviations of place names, and post codes from one or more geographic databases (e.g., country databases, city databases, and state databases). Text from the fields identified as location-related (i.e., location fields) is extracted, and the individual words and combinations of the words are used to search the geographic databases. In an embodiment, numbers that match common world post code patterns are searched for potential matches. Each search (country, city, state, post code) may be done independently, followed by the pulling together of the pieces of information to corroborate one other. For example, if both city and state information are extracted, and if that state is known to contain a city with that name, then the corresponding information receives a higher candidate score. In an embodiment, a distance between the pieces of information is calculated based on latitude and longitude from the database, and the distance between the points specified by the latitude and longitude is factored in to the scoring and final resolution. In an embodiment, the location information is resolved first, followed by resolution of the entity information, as described in greater detail below.

According to embodiments of the present invention, in block 240, entity resolution may include candidate lookup, pairwise matching and list matching, described in greater detail below. The matching stages (both pairwise and list matching) both involve feature extraction and classification. The system is designed in a modular fashion such that the choice of features and implementation of their extraction is independent of the choice and implementation of the classifier.

In an embodiment, the entity resolution includes a candidate look up feature. In this step, a name string from an identified entity field (also referred to as a "raw entity") is compared to a master list of entity names maintained in an associated data store (also referred to as the "entity database").

According to embodiments of the present disclosure, in block 240, given a raw entity to be resolved, a list of candidates is retrieved from the entity database using one or more of the following techniques: Prefix-based Retrieval, K-Nearest Neighbors (KNN), Approximate Nearest Neighbors (ANN), and locality-sensitive hashing (LSH).

In an embodiment, the Prefix-based Retrieval method includes sorting the entity database by legal name, finding a lexicographical insertion point for the raw transaction name, and returning the entity database names that are near to the insertion point. Words that are most frequent in the master list of entity names (e.g., >0.5%, such as "the", "of, "company", and "inc") may be excluded from the look-up since they do not strongly distinguish between entities, and may also be absent in either the transaction or the master list. The range of names before and after the lexical insertion point is determined by two parameters: window_size and max_look_ forward. A number of records before the lexical insertion point (equal to the window size) are included among the candidates. The same number of candidates beyond the lexical insertion point is also included. Beyond the initial window post-insertion point, additional records are included as long as the candidates' names share the same first word as in the query's name, up to a maximum of max_look_forward. Candidates are first drawn from the subset of Legal Entities, and then (if still no match) from Ultimate Parents.

In an embodiment, in the K-Nearest Neighbor lookup approach, a quantifiable representation of features of the query is defined. Using those features, the relative distances between the query and the items in the source are determined, and the items that are closest to the query in that feature space are returned. In an embodiment, the feature array by which sorting is performed is the position and identity of the letters in the name. In an embodiment, the feature array may be more abstract, such as, for example, a frequency of one-letter and two-letter combinations. In an embodiment, the nearest neighbor lookup may employ K-dimensional tree lookup or Ball tree lookup. These tree lookups pre-calculate feature scores that recursively divide the possible matches in half, thus making fast lookup possible.

Whereas K-Nearest Neighbors finds the items that are definitely the nearest ones in the feature space relative to the target, Approximate Nearest Neighbors techniques find the items that are probabilistically most similar. The advantage of trading off absolute certainty is fewer features to compare, which translates into faster comparisons. In an embodiment, in block 240, a locality-sensitive hashing approach, which is an example of an Approximate Nearest Neighbors technique, may be employed, wherein the items that are probabilistically most similar are identified. In this embodiment, the LSH approach presents a savings in efficiency when the number of original features is great and there are many items to be compared.

According to embodiments of the present disclosure, following candidate lookup, a pairwise matching feature is employed in block 240. In an embodiment, the list of candidates is compared one-by-one to the raw entity, computing a similarity score based on name and location information. One or more distinct similarity measures may be used, and the results are combined to generate a composite score. The composite score represents confidence that each candidate is the true match for the given raw entity query. The top scoring candidate is returned as the best potential match, along with its composite score. In an embodiment, if a composite score does not exceed a minimum threshold value, then no match is identified.

In an embodiment, the fields used for comparison (entity/name and location) are text-based fields, therefore the measures considered are string comparisons. In an embodiment, the similarity of two strings are measured at different grain sizes (e.g., characters vs. words) using one or more methods. It is noted that a word's grain size is often also referred to as tokens.

According to embodiments of the present disclosure, several different similarity measures may be employed, as described below in detail. For example, a Jaccard distance approach may be employed on names and locations at the token level. In another example, a Smith-Waterman distance approach may be employed on names at the character level.

In an embodiment, the Jaccard distance equals the length of the intersection of the two sets divided by the length of the union. In an embodiment, the Jaccard distance works with any grain size and represents a number of unique units common to both sets, divided by the total number of unique units collapsing across both sets, and may be represented by the following equation:

$$dist_{jaccard} = \frac{set_1 \cap set_2}{(set_1 \cup set_2) + \text{offset}}$$

$$\text{offset} = 0.1$$

According to embodiments of the present disclosure, units at the character or token levels may also be analyzed in N-unit groups. For example, the string "dog_doctor" expressed in character 2-grams (or bi-grams) would be: 'do', 'og', 'g_', '_d', 'do', 'oc', 'ct', 'to', 'or'. From the N-grams, Jaccard distance or cosine similarity may be calculated. In an embodiment, cosine similarity treats each of the N-grams as separate dimensions and computes the multidimensional geometric distance between the N-gram frequencies of the pair.

In an embodiment, another measure based on the word-initial letters called "common initials" may be used. It is noted that "word" here is used to refer to groups of non-space characters surrounded by space and/or the beginning or end of the string. The "common initials" measure may be defined as the Jaccard distance of the word-initial letters of the two strings, and may be represented by the following equation:

$$CommonInitials(A, B) \frac{|InitialLetterSet(A) \cap InitialLetterSet(B)|}{|InitialLetterSet(A)|}$$

The Jaro-Winkler metric combines the similarity of both the characters and position of those characters between two strings. The formulae for the metric are below, followed by definitions of the symbols.

$$JaroWinkler(s, t) = Jaro(s, t) + \frac{P'}{10} \cdot (1 - Jaro(s, t))$$

$$Jaro(S, t) = \frac{1}{3} \cdot \left( \frac{|s'|}{|s|} + \frac{|t'|}{|t|} + \frac{|s'| - T_{s',t'}}{|s'|} \right)$$

$$P' = \min(P, 4)$$

$$P = LongestCommonPrefix(s, t)$$

Let s be a string with characters $a_1 \ldots a_K$ and t be a string with characters $b_1 \ldots b_L$.

Let s' $s'=a'_1 \ldots a'_K$ represents characters from s that appear in the same order and position in t (or within $$\frac{\max(|s|, |t|)}{2}$$

indices away from me same position). The definition for $t'=b'_1 \ldots b'_L$, is analogous, just in the opposite direction.

Let a transposition refer to the case when $a_i' \neq b_j'$. The symbol $T_{s',t'}$ equals half the number of transpositions for the two sequences of characters s' and t'.

In an embodiment, a metric called "seqmatch" may be defined that finds the proportion of the two sequences that can be accounted for by recursively identifying the longest matching substring. The result is a rational number in the range of [0,1], inclusive. The algorithm may be defined as follows:

1. Find the longest matching substring and store its length
2. Find the next longest matching substring, excluding already-matched substrings, and store its length
3. Repeat step 2 until all matches are exhausted.
4. Return ratio:

$$seqmatch(A, B) = \frac{2 \cdot \sum MatchLengths}{|A| + |B|},$$

where A and B are character sequences, and their norms are their respective lengths in characters.

In an embodiment, Boolean location match features may be defined for location information such as city and country. The values for city and country as extracted from the raw text by location resolution may be compared to the city and country values associated with a candidate entity. For each piece of location information (e.g. city and country, treated separately), the values resolved from the raw text are compared to the candidate location values. Exact matches receive a value of 1, otherwise 0.

In an embodiment, a term frequency, inverse document frequency (TF-IDF) approach may be employed wherein each feature (dimension) is inversely-weighted by how common that feature is across items in an entire corpus. The value of this feature is computed from the cosine similarity of the TF-IDF weights. TF-IDF weights are defined by the following equations, where J is a variable that refers to individual documents (e.g., individual raw entity names), D refers the set of all documents in the collection (e.g., all the raw entity names), and t refers to individual terms (i.e., words) in the documents.

$tf_{t,d}$ = number of occurrences of word $t$ in document $d$ $$tdf_{t,D} = \log\left(\frac{N}{|\{d \in D : t \in d\}|}\right)$$

$$tfidf_{t,d,D} = tf(t, d) \cdot ldf(t, D)$$

In an embodiment, a Smith-Waterman (SW) distance may be determined and used to compare names at the character grain size. For example, a SW distance may be determined by examining sub-strings that two candidates in a pair have in common, allowing for (and penalizing) insertions, deletions, and mismatches. The implementation applies the algorithm described in Smith & Waterman (1981) to strings and includes a cost matrix for matches and mismatches between character classes of uppercase, lowercase, digit, and punctuation as specified below.

| Mismatch Costs between character classes for Smith-Waterman distance From\To | upper | lower | digit | punctuation |
|---|---|---|---|---|
| upper | −20 | | | |
| lower | −20 | −20 | | |
| digit | −10 | −10 | −5 | |
| punctuation | −1 | −1 | −1 | −1 |

| Match costs by character classes | |
|---|---|
| From-To | Match cost |
| upper-upper | +20 |
| upper-lower | +15 |
| lower-lower | +20 |
| digit-digit | +5 |
| punctuation-punctuation | +1 |

For reasons of computational efficiency, a smaller subset of comparison features may be used in place of a larger set of features while still maintaining enough information for robust classification. The process of selecting a reduced set of features could involve estimation of feature importance by applying a classification model and comparing the features to one another using recursive feature elimination. FIG. 16 shows a set of features for which feature importance scores were computed based on the application of a Random Forest Classifier. The feature abbreviations enumerated on the horizontal axis are described in the table in FIG. 23. In an example test represented by FIG. 16, character 3-grams were by far the most important.

According to embodiments of the present disclosure, individual measures may be combined and converted to confidence scores using a classifier. The choice and implementation of the classifier is independent of the choice of features and the method of feature extraction. Any classifier could be used, and the effectiveness of the overall entity resolution system can be influenced by how well-suited the classifier is. Two examples of classifiers are described in depth in this disclosure: Logistic Regression and Naïve Bayesian logic. Alternatively, other classifiers, such as a Tree-Augmented Naïve Bayes classifier, could be applied instead.

In an embodiment, a logistic regression method fits a parameter vector (β) to the following formula using the observed feature vectors (X) and the corresponding class observations (y∈{0,1}).

$$y = \frac{1}{i + e^{-\beta X}}$$

The probability that a given observation is a match $^{y=1}$(y=1) is then estimated by using the vector of feature scores X and the fitted parameter vector (β):

$$P(y = 1 \mid X, \beta) = \frac{1}{1 + e^{-\beta X}}$$

According to an embodiment, the following table shows an example vector of coefficients that may be used in a logistic classifier.

| Feature | β coefficient |
|---|---|
| (Intercept) | −0.710 |
| Jaccard Distance | 3.725 |
| character 2-grams (left) | 2.295 |
| character 4-grams | 3.619 |
| Common Initials | 0.551 |
| Jaro-Winkler | −6.658 |
| Seqmatch | 0.620 |
| City | 1.445 |
| Country | 0.594 |

To illustrate how the Logistic Regression classifier works, an example is presented. The example that will be described now played Account Party role in a transaction and had the raw text: "THE EXAMPLE AND SAMPLE BANK LTD|ABCDEF12345|SAMPLELAND BRANCH INDIA". The extracted name was "THE EXAMPLE AND SAMPLE BANK LTD", and the extracted location text was "ABCDEF12345 SAMPLELAND BRANCH INDIA". The location resolver decided that the country was India and the city was Sampleland. The candidates retrieved based on the name text are presented in FIG. 24. The feature scores comparing the target with each candidate are shown in FIG. 25.

The first three candidates will be used to show how their feature values were combined with the model fit parameters to produce the final score.

The score computation for the first candidate can be exemplified by the following expressions:

$$\beta X = \begin{bmatrix} 1 \\ 0 \\ 0.064 \\ 0 \\ 0.1667 \\ 0.4796 \\ 0.2917 \\ 0 \\ 0 \end{bmatrix}, \begin{bmatrix} -0.7103 \\ 3.7248 \\ 2.2948 \\ 3.6193 \\ 0.5506 \\ -6.6577 \\ 0.6196 \\ 1.4451 \\ 0.5943 \end{bmatrix} = -3.4828$$

$$P(y = 1 \mid X, \beta) = \frac{1}{1 + e^{-\beta X}} = \frac{1}{1 + e^{-(-3.4828)}} = 0.0298$$

The score computation for the second candidate can be exemplified by the following expressions:

$$\beta X = \begin{bmatrix} 1 \\ 0 \\ 0.0968 \\ 0 \\ 0.1667 \\ 0.5333 \\ 0.3556 \\ 0 \\ 0 \end{bmatrix}, \begin{bmatrix} -0.7103 \\ 3.7248 \\ 2.2948 \\ 3.6193 \\ 0.5506 \\ -6.6577 \\ 0.6196 \\ 1.4451 \\ 0.5943 \end{bmatrix} = -3.7266$$

$$P(y = 1 \mid X, \beta) = \frac{1}{1 + e^{-\beta X}} = \frac{1}{1 + e^{-(-3.7266)}} = 0.0235$$

The score computation for the third candidate can be exemplified by the following expressions:

$$\beta X = \begin{bmatrix} 1 \\ 0 \\ 0.0968 \\ 0 \\ 0.1667 \\ 0.4699 \\ 0.3265 \\ 0 \\ 0 \end{bmatrix}, \begin{bmatrix} -0.7103 \\ 3.7248 \\ 2.2948 \\ 3.6193 \\ 0.5506 \\ -6.6577 \\ 0.6196 \\ 1.4451 \\ 0.5943 \end{bmatrix} = -3.3225$$

$$P(y = 1 \mid X, \beta) = \frac{1}{1 + e^{-\beta X}} = \frac{1}{1 + e^{-(-3.3225)}} = 0.0348$$

The highest pair-matcher score (from the classifier) was 0.8922 (for Candidate ID 11). Since the next highest score (0.1123) was outside the similarity threshold (0.05) of difference, list matcher logic is not pursued, and the Candidate ID 11 with score 0.8922 is returned as the match.

With Naïve Bayesian logic, an overall likelihood of a given pairing being a match is computed based on the individual measure likelihoods. More specifically, this method is derived from Fellegi & Sunter's model of record linkage (1969). The computation of match probability is based on distributions of each measure for accurately-matched pairs versus random (un-matched) pairs. The likelihood of a given score on a given measure equals the corresponding matched-pair density divided by the random-pair density. The random-pair density thus serves as a baseline. In the equation below, $R_i$ represents the odds of a single feature observation $x_i$ is a match (M) as opposed to a non-match (U). Assuming that all features are independent, the individual log odds can be combined and exponentiated to compute the overall likelihood ratio, $LR_{overall}$. The final score is then calculated as the ratio of the likelihood ratio to the sum of the prior ratio and the likelihood ratio.

$$LR_i \frac{P(x_i \mid r \in M)}{P(x_i \mid r \in U)}$$

$$LR_{overall} = e \sum_{i \leq}^{n} \ln(LR_i)$$

$$PriorRatio = \frac{MismatchPrior}{MatchPrior} = \frac{(1 - MatchPrior)}{MatchPrior}$$

$$score = \frac{LikelihoodRatio_{overall}}{(PriorRatio + LikelihoodRatio_{overall})}$$

In an embodiment, the match prior for legal entities and for ultimate parents was found to equal the values in the "MatchPrior" expression below. Using those exemplary values, prior ratios can be calculated as in the "PriorRatio" expression below.

$$MatchPrior = \begin{bmatrix} 0.33 \text{(legal entity)} \\ 0.12 \text{(ultimate parent)} \end{bmatrix}$$

$PriorRatio =$ $$\frac{MismatchPrior}{MatchPrior} = \frac{(1 - MatchPrior)}{MatchPrior} = \begin{bmatrix} \frac{0.67}{0.33} = 2.03 \text{(legal entity)} \\ \frac{0.88}{0.12} = 7.33 \text{(ultimate parent)} \end{bmatrix}$$

To determine a minimum threshold for the score to be considered a match, a cost ratio is defined that takes into account the relative costs of classifying a pair as a match depending on whether it truly is a match. The table below specifies the costs assigned, and the equations below define how those costs are used to determine the minimum score threshold necessary to classify a pair as a match.

Match Cost Matrix

|  |  | ... if actually | |
| --- | --- | --- | --- |
|  |  | Mismatch | Match |
| classified as ... | Mismatch | 0 | −1 |
|  | Match | −10 | 5 |

According to the example "MatchPrior", "PriorRatio", and match cost matrix values above, a cost ratio and match threshold may be determined as in the following expressions:

$$CostRatio = \frac{(match_{ifmismatch} - mismatch_{ifmismatch})}{(mismatch_{ifmatch} - match_{ifmatch})} = \frac{-10}{-6} = 1\frac{2}{3}$$

$$MatchThreshold_{(for\,sum\,logLikR)} = \log(CostRatio \times PriorRatio)$$

$$MatchThreshold_{legal\,entity} = \log\left(1\frac{2}{3} \cdot 2.03\right) = 1.22$$

$$MatchThreshold_{ultimate\,parent} = \log\left(1\frac{2}{3} \cdot 7.33\right) = 2.50$$

In an example, the probabilities of whether pairs matched on city conditional on whether pairs were matched or randomly paired in the following table:

|  | City match | City not match | Country match | Country not match |
| --- | --- | --- | --- | --- |
| Match | 0.9232 | 0.0768 | 0.9513 | 0.0487 |
| Baseline | 0.0276 | 0.9724 | 0.1206 | 0.8794 |

-continued

|  | City match | City not match | Country match | Country not match |
| --- | --- | --- | --- | --- |
| Likelihood Ratio (match/ baseline) | 33.44928 | 0.07898 | 7.88806 | 0.05538 |
| Log Likelihood Ratio | 3.51003 | −2.53856 | 2.065350186 | −2.89356 |

In this example, each candidate may be assigned a log likelihood ratio for a city mismatch (e.g., −2.53856) and country mismatch (e.g., −2.89356), as shown in the table above. In an embodiment, the likelihood ratios for location tokens may also be based on matched versus baseline distributions, and the likelihood ratios may be computed, as shown in the table below. In an embodiment, since the candidates in this example scored zero (i.e., shared no tokens in common with the query), the candidates may be assigned log likelihood ratios of −0.51278, as shown in the following table:

|  | [0, 0.2] | (0.2, 0.4] | (0.4, 0.6] | (0.6, 0.8] | (0.8, 1.0] |
| --- | --- | --- | --- | --- | --- |
| Likelihood ratio | 0.59883 | 34.61224 | 42.80000 | 55.66666 | 32.33333 |
| Log Likelihood | −0.51278 | 3.54421 | 3.75654 | 4.01938 | 3.47610 |

According to embodiments of the present disclosure, other measurements may be used to determine the overall score, such as, for example, a name string distance and a name token distance. In an embodiment, a probability density of the name string distance measurement and the name token distance measurement may be used to calculate a log likelihood ratio of the name string measures and the name token measures. An example probability density of a name string measure and a name token measure is provided in the following table:

|  |  | 0.0 | 0.1 | 0.2 | 0.3 | 0.4 |
| --- | --- | --- | --- | --- | --- | --- |
| Name (SW) | Matched | 0.00200 | 0.00200 | 0.00200 | 0.31038 | 0.82435 |
| Name (SW) | Baseline | 0.75587 | 4.59011 | 3.74738 | 0.69995 | 0.11083 |
| Name (Jaccard) | Matched | 0.00200 | 0.05389 | 0.27046 | 1.17665 | 1.52196 |
| Name (Jaccard) | Baseline | 8.12575 | 1.54391 | 0.17166 | 0.07585 | 0.01896 |

|  |  | 0.5 | 0.6 | 0.7 | 0.8 | 0.9 |
| --- | --- | --- | --- | --- | --- | --- |
| Name (SW) |  | 1.34930 | 1.49900 | 1.55589 | 3.27345 | 1.18164 |
| Name (SW) |  | 0.03595 | 0.01498 | 0.00799 | 0.02496 | 0.01198 |
| Name (Jaccard) |  | 0.60878 | 0.38523 | 1.24152 | 0.42814 | 4.31138 |
| Name (Jaccard) |  | 0.01198 | 0.00499 | 0.01497 | 0.00399 | 0.02794 |

In an embodiment, for a given entity name query, a table may be generated including the name pair-scores by measure (e.g., SW measure, Jaccard distance measure) for the multiple candidates. In an embodiment, the table may include, for example, an SW score, a log likelihood ratio of the SW score, and a decision indicating a 'match' or a 'mismatch' for each of the candidate names. FIG. 4 illustrates an example including name pair-scores by SW measure for an example query for "EXAMPLE BANK PLC". FIG. 5 illustrates an example table including name pair-scores by Jaccard distance measure for an example query for "EXAMPLE BANK PLC".

According to embodiments of the present disclosure, a score and decision calculation may be performed on the example transaction's original candidate list. In an embodiment, after applying the match score threshold, a quantity of selected candidates may be identified and advanced to the list-matching phase of the resolution process of block 240. For example, FIG. 6 illustrates an exemplary table depicting a match score calculation for the pair matching (based on an example original candidate list having 25 entries and a match score threshold of greater than or equal to 0.711).

In the example shown in FIG. 6, thirteen top or selected candidates are identified (i.e., the entries identified as a 'match' in FIG. 6) and advanced to the list matching phase of the resolution process.

According to embodiments of the present disclosure, in block 240, a list matching process may be applied to the identified top candidates. In an embodiment, in the event that several top candidates have similar scores, those candidates may be subjected to an additional comparison that factors in one or more properties of the remaining candidates as a group. In an example, a lower limit of the 'top candidates' may be defined by a maximum score minus a predefined value (e.g., 0.05). In an embodiment, if more than one top candidate's score is above the determined lower limit, then the top candidates may be deemed too similar, and list-matching is applied. An exemplary representation of the lower limit of the top candidates may be expressed as follows:

$$TopCandidates_{LowerLimit} = \max(PairScores) - 0.05$$

According to an embodiment of the present disclosure, list matching may include re-analyzing the pair-wise similarity between the query and the top candidates. The pair-wise similarity measures used during list matching may include, but are not limited to, a Jaccard distance measure (e.g., with no offset) of letter uni-grams and letter bi-grams, and a proportional length of a longest common prefix. In an embodiment, the longest common prefix is character-based, including spaces. For example, the longest common prefix between "Central Park Recreation" and "Central Perk Coffee" is "Central P", which is 9 characters long. In this example, if "Central Park Recreation" is treated as the query, then the proportional longest common prefix is 9/23, as calculated according to the following expression:

$$ProportionalLongestCommonPrefix(s1, s2) = \frac{len(LongestCommonPref(s1, s2))}{len(s1)}$$

According to embodiments of the present disclosure, each candidate receives three measures in the form of proportions. In an embodiment, a norm of these three proportions may be taken to identify a list-matcher score. The top candidates may be sorted in descending order based on the list-matcher score, and a first candidate in the sorted list may be selected as the match. An example representation of the list-matcher score is as follows:

$$ListMatcherScore = \| [Jaccard_{3grams}, Jaccard_{2grams}, ProportionalLongestCommonPrefix] \|$$

Continuing the example from above (i.e., for the "EXAMPLE BANK PLC" query) wherein the pair-matching phase passed thirteen top candidates to the list-matching phase, a 'top candidates' window (filtering candidates having a score of ≥0.913) may be applied. Upon application of the top candidates window, the following five candidates (a subset of those in FIG. 6) are identified but are within the 'similarity' range, and thus the list-matching process is applied.

| ID | Name | Pair Match Score | City | Country | Decision |
|---|---|---|---|---|---|
| 3 | EXAMPLE BANK PLC | 0.963 | GREAT BRITAIN AND NO | UNITED STATES | match |
| 4 | EXAMPLE BANK PLC | 0.963 | LONDON | UNITED KINGDOM | match |
| 5 | EXAMPLE BANK PLC | 0.963 | JAPAN | JAPAN | match |
| 14 | EXAMPLE BANK PLC-MILAN | 0.915 | ITALY | ITALY | match |
| 16 | EXAMPLE BANK PLC-PARIS | 0.915 | PARIS | FRANCE | match |
| QUERY | EXAMPLE BANK PLC. | | | Netherlands | |

In this example, the comparisons in the list-matching phase are based on the "name" only (excluding location information), of which there are three unique candidate name strings. When compared with the query name string, the candidate name strings are assigned the following uni-gram, bi-gram, and proportional scores:

'EXAMPLE BANK PLC': {
  1: 0.9090909090909091,
  2: 0.8125,
  ProportionalLongestCommonPrefix: 0.9285714285714286},
'EXAMPLE BANK PLC-MILAN': {
  1: 0.7142857142857143,
  2: 0.6190476190476191,
  ProportionalLongestCommonPrefix: 0.9285714285714286},
'EXAMPLE BANK PLC-PARIS': {
  1: 0.7142857142857143,
  2: 0.5909090909090909,
  ProportionalLongestCommonPrefix: 0.9285714285714286}}

In this example, a file list-matcher score (i.e., the norms) of the five candidates identified in the table above are as follows:

[(1.5326, 'EXAMPLE BANK PLC'),
(1.5326, 'EXAMPLE BANK PLC'),
(1.5326, 'EXAMPLE BANK PLC'),
(1.3250, 'EXAMPLE BANK PLC-MILAN'),
(1.3121, 'EXAMPLE BANK PLC-PARIS')]

In this example, the five candidates are sorted in descending order by the list-matcher scores, and the top list-matcher result is selected as the final match.

According to embodiments of the present disclosure, the list-matching phase may employ measures (as described above, such as, a Jaccard measure, the N-grams measure, the TF-IDF measure) which are adjusted given the candidates are in a 'highly similar' final candidate pool. An exemplary adjustment to the measures may include an adjustment to the Jaccard distance wherein the units (e.g., the characters or words) that all of the candidates have in common are ignored.

Another exemplary adjustment to the measures may include an adjustment to the N-grams measure, wherein the average frequency of each n-gram feature is subtracted from the individual items' frequencies. In this embodiment, the influence of n-grams that are frequent in many of the candidates is reduced.

In another embodiment, an adjustment to the TF-IDF may be made, wherein in the pair-matching phase, the "corpus" is defined as the group of highly similar candidates (as compared to the "corpus" being the full master list of entities, as is in the pair-matching phase).

With reference to FIG. 2, following block 240, the information in the selected fields is resolved. The resolved information generated in block 240 may include location information, entity information, and match confidence scores. In an embodiment, the resolved location information may include one or more of a country, state, city, latitude, and longitude. In an embodiment, the resolved entity information may include one or more of a unique identifier from the master list of legal entities or ultimate parent identifier, a legal name, metadata available from the master list, etc. In an embodiment, the resolved information may further include a match confidence score for both the location information and the entity information.

In block 250, further processing of the resolved information may be performed. In an embodiment, before aggregating the resolved transaction data and ingesting the data into a database (e.g., a graph database, a distributed columnar database, a relational database) for further processing (e.g., multiple-degree-out analysis, risk modeling, forecasting, etc.), the data may be filtered by entity and location resolution scores.

The quality of entity resolution can be assessed in terms of "precision", "recall", and "coverage", which may be defined as follows. "Precision" at a given score threshold is defined as the number of correct resolutions with scores above the threshold divided by the total number of resolutions with scores above the threshold. "Coverage" is defined as the number of resolutions with scores above the threshold divided by the total number of entities. Finally, "recall" is defined as the number of correct resolutions above the threshold divided by the total number of correct resolutions. These definitions can be summarized by the following expressions.

$$precision = \frac{NumCorrectAboveThreshold}{NumAboveThreshold}$$

$$coverage = \frac{NumAboveThreshold}{TotalNum}$$

$$recall = \frac{NumCorrectAboveThreshold}{NumCorrect}$$

In an embodiment, a target level of precision for entity resolution may be set (e.g., above 90%) and a cutoff score to sustain the level of precision is determined. In an embodiment, a recall rate and its dependence on the cutoff scores may be tracked in order to retain the level of precision (e.g., retain above 90% recall) relative to the total entity resolution rate. According to embodiments of the present disclosure, a distribution of the scores of the resolved entities may be generated. In an example, using an inverse cumulative distribution function (CDF) of the distribution, a score cutoff's effect on recall rate may be determined. In an example, the effect on precision may be estimated using a set of correct resolutions. A score cutoff of 90% produces 88% precision and 83% recall relative to the set of resolved entities.

The performance of two configurations of the Entity Resolver was tested and compared: one configuration with the Logistic Regression classifier and the other with the Naïve Bayes classifier. To test the performance, the two versions of the entity resolver were run on a sample of 2000 known entities extracted from transactions. From the resolution results consisting of resolution scores and whether the resolved entities matched the known identities, precision, coverage, and recall were computed.

The results reported in FIGS. 17 and 18 show that the entity resolver using a Logistic Regression Classifier performed with better precision and more flexibility to trade off coverage for precision than the one with the Naïve Bayes Classifier. Using a score threshold of 0.9, the Logistic Regression-based resolver achieved 88% precision, whereas the Naïve Bayes-based resolver achieved 73% precision. However, overall coverage with the Naïve Bayes classifier (95%) was better than that using the Logistic Regression classifier (65%).

Figure 19:
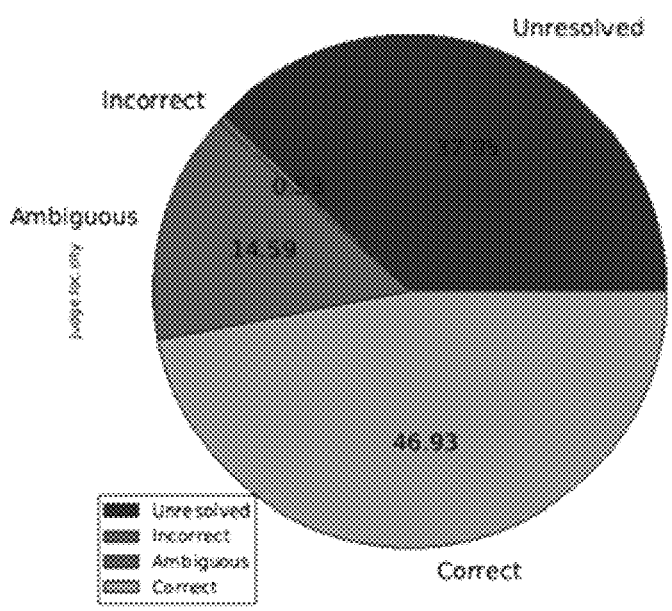
FIG. 19 shows the percent of entities resolved by an Entity Resolver using a Logistic Regression classifier. Results are grouped by side of the transaction ("debit" or "credit") as well as the depth of the party (distance of the party from the transaction mid-point). Note that in a given transaction not all positions contain an entity. For example, "debit 3" may not always be the debiting endpoint, and "credit 4" may not always be the crediting endpoint.

To further explore coverage within the context of transactions, FIG. 19 shows the percent of entities from 2013 transactions that were resolved with a score greater than or equal to 0.5. The results are grouped by the transaction positions in which they appeared. Some transactions can have up to 7 entities in a single transaction chain, going from debiting starting point to crediting endpoint. The positions are referred to relative to a mid-point that divides them into a debit side and a credit side, where "Debit 3" or "D3" refers to the first possible debiting starting point, "Debit 1" or "D1" refers to the last possible debiting role before the mid-point, "Credit 1" or "C1" refers to the first transaction position away from the mid-point on the credit side, and "Credit 4" or "C4" refers to the last possible crediting role. However, note that in a given transaction not all positions contain an entity. For example, "Debit 3" may not always be the actual debiting starting point, and "Credit 4" may not always be the crediting endpoint. Positions in the middle, such as "Debit 2" (80%), "Debit 1" (78%), and "Credit 1" (73%), have the highest percent resolved.

Figure 7:
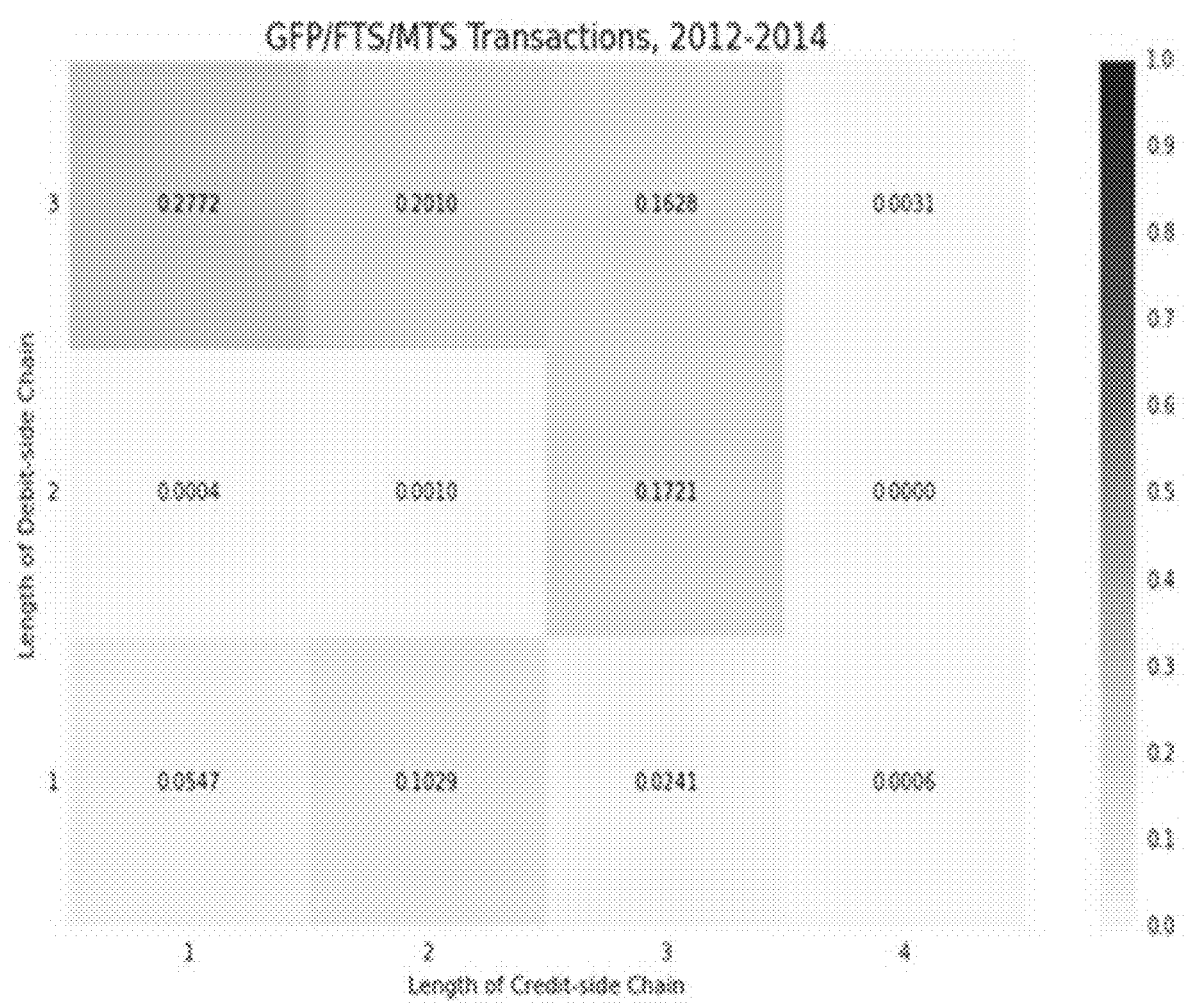
FIG. 7 illustrates ratios of exemplary transactions that show a given "depth" on the debit-side and a given "depth" on the credit-side of a transaction, where "depth" refers to how many entities participated in the transaction chain on each side.

According to an embodiment of the present disclosure, a "length" of a debit-side or credit-side represents a quantity or number of positions a furthest occupied position is away from a mid-point. FIG. 7 shows the proportion of transactions with a given debit-side length and a given credit-side length. The most frequent pattern had a long debit-side chain (length of 3) and a credit-side length of 1. As shown in FIG. 7, an inference may be made that many transactions have multiple intermediary parties, especially on the debit side.

Figure 26:
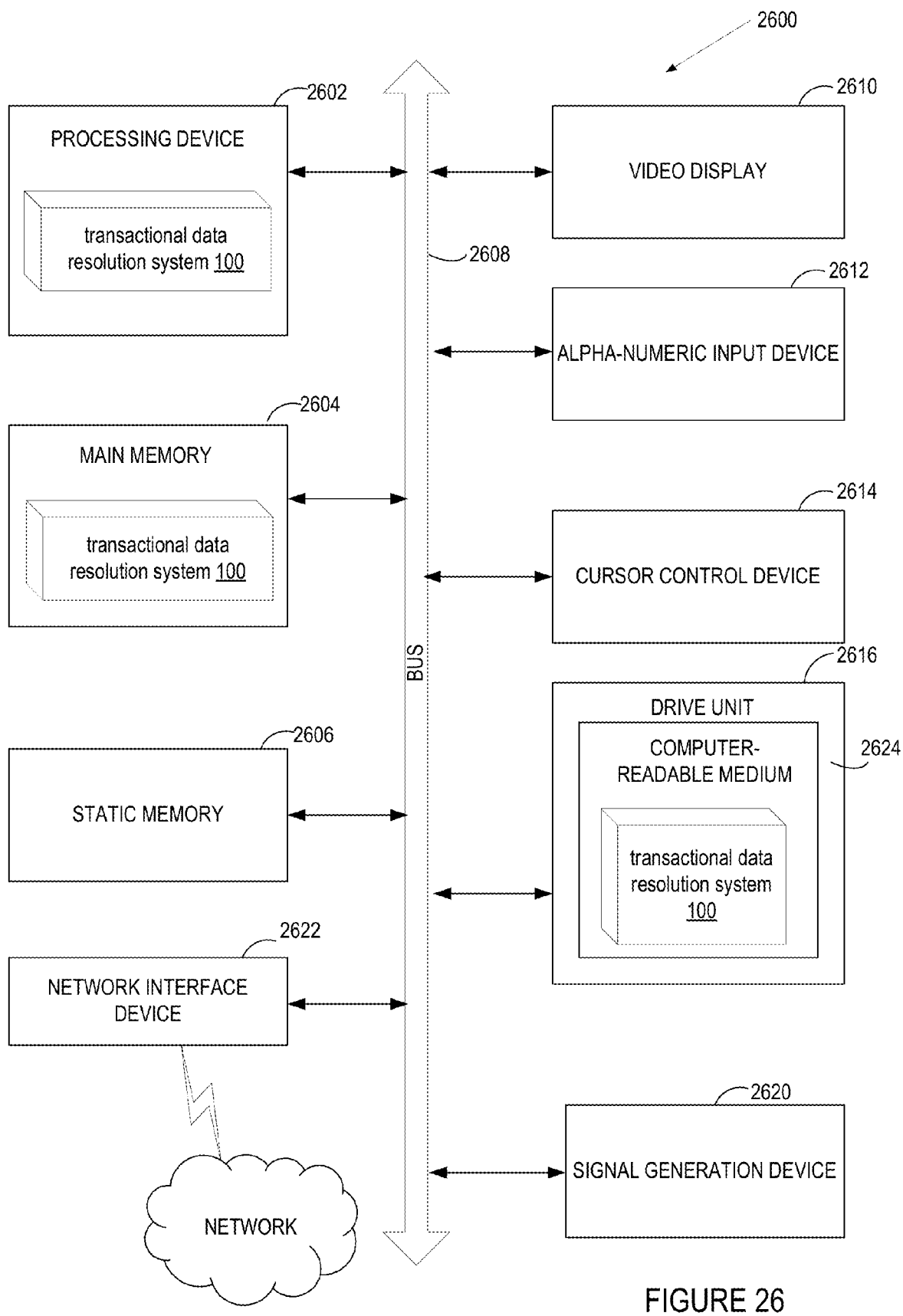
FIG. 26 illustrates an exemplary computer architecture including a transactional data resolution system, according to embodiments of the present disclosure.

FIG. 26 illustrates an exemplary system 2600 in the form of a computer system within which a set of instructions, for causing the machine to perform any one or more of the methodologies discussed herein, may be executed. In some embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

In implementations, the system 2600 includes a processing device (e.g., a processor) 2602, a main memory 2604 (e.g., read-only memory (ROM), flash memory, dynamic random access memory (DRAM) such as synchronous DRAM (SDRAM)), a static memory 2606 (e.g., flash memory, static random access memory (SRAM)), and a data storage device 2616, which communicate with each other via a bus 2606.

Processing device 2602 represents one or more general-purpose processing devices such as a microprocessor, central processing unit, or the like. More particularly, the processing device 2602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 2602 may also be one or more special-purpose processing devices such as an application specific integrated circuit (ASIC), a field programmable gate array (FPGA), a digital signal processor (DSP), network processor, or the like. The transactional data resolution system 100 in FIG. 1 may be executed by a processing device 2602 (e.g., processing device 150) configured to perform the operations and steps discussed herein, including, but not limited to, the operations of modules of the transactional data resolution system 100 of FIG. 1.

The system 2600 may further include a network interface device 2622. The system 2600 also may include a video display unit 2610 (e.g., a liquid crystal display (LCD) or a cathode ray tube (CRT)), an alphanumeric input device 2612 (e.g., a keyboard), a cursor control device 2614 (e.g., a mouse), and a signal generation device 2620 (e.g., a speaker).

A drive unit 2616 may include a computer-readable medium 2624 on which is stored one or more sets of instructions (e.g., instructions of the transactional data resolution system 100) embodying any one or more of the methodologies or functions described herein. The instructions of the transactional data resolution system 100 may also reside, completely or at least partially, within the main memory 2604 and/or within the processing device 2602 during execution thereof by the system 2600, the main memory 2604 and the processing device 2602 also constituting computer-readable media. The instructions of the transactional data resolution system 100 may further be transmitted or received over a network via the network interface device 2622.

While the computer-readable storage medium 2624 is shown in an exemplary embodiment to be a single medium, the term "computer-readable storage medium" should be taken to include a single medium or multiple media (e.g., a centralized or distributed database, and/or associated caches and servers) that store the one or more sets of instructions, such as, for example, a non-transitory computer-readable storage medium. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "generating", "identifying", "resolving", "aggregating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The terms "first", "second", "third", "fourth", etc. as used herein are meant as labels to distinguish among different elements and may not necessarily have an ordinal meaning according to their numerical designation.

It is to be understood that the above description is intended to be illustrative, and not restrictive. Many other embodiments will be apparent to those of skill in the art upon reading and understanding the above description. Whereas many alterations and modifications of the present disclosure will no doubt become apparent to a person of ordinary skill in the art after having read the aforementioned description, it is to be understood that any particular embodiment described and shown by way of illustration is in no way intended to be considered limiting.

What is claimed is:

1. A computer-implemented method comprising:
   receiving, by a processing device, a plurality of raw transaction records from a plurality of data sources;
   identifying transaction pairs from the raw transaction records, transaction pairs including multiple transactions relating to a common transaction between a transaction source and a transaction destination, at least some transaction pairs including a source transaction, an intermediate transaction, and a destination transaction;
   generating a plurality of transaction pair records from the identified transaction pairs, wherein each transaction pair record comprises a plurality of related raw transaction records; identifying one or more selected fields corresponding to one or more selected data categories from each of the plurality of transaction pair records, wherein the one or more selected fields comprise raw information;
   wherein the format of the one or more selected fields varies among the transaction pair records such that selected fields are identified based on the use of at least one field identification technique that applies transaction record rules to determine selected fields in at least some transaction pair records;
   wherein the one or more selected fields includes at least an entity field;
   determining pair match scores corresponding to a plurality of candidate entity names using a similarity measure;
   identifying a set of top candidate entity names having similar pair match scores;
   performing list matching on the set of top candidate entity names using an adjusted similarity measure to identify a top match;
   establishing the top match as the resolved entity information;
   resolving the raw information in the one or more identified selected fields to generate resolved information corresponding to the one or more data categories; and
   aggregating the resolved information for storing in a data store.

2. The computer-implemented method of claim 1, wherein the one or more selected fields corresponding to one or more data categories comprise at least one location field and at least one entity field.

3. The computer-implemented method of claim 2, wherein the at least one location field comprises raw location information and the at least one entity field comprises raw entity information.

4. The computer-implemented method of claim 3, wherein resolving the raw location information further comprises:
   extracting the raw location information from the one or more location fields;
   searching one or more geographic databases based on the extracted raw location information;
   identifying, based on the search, a plurality of candidate locations comprising city information and state information;
   determining a score for each of the plurality of candidate locations; and
   identifying a resolved location based on the scores for each of the plurality of candidate locations.

5. The computer-implemented method of claim 3, wherein resolving the raw entity information further comprises:

searching an entity database based on an entity query associated with the raw entity information to identify a plurality of candidate entity names; and performing pairwise matching based on the identified plurality of candidate entity names to generate a pair match score for each of the identified plurality of candidate entity names.

6. A system comprising:

a memory; and a processing device coupled to the memory, the processing device configured to:

receive a plurality of raw transaction records from a plurality of data sources; identify transaction pairs from the raw transaction records, the transaction pairs including multiple transactions relating to a common transaction between a transaction source and a transaction destination, at least some transaction airs including a source transaction, an intermediate transaction, and a destination transaction;

generate a plurality of transaction pair records from the identified transaction pairs, wherein each transaction pair record comprises a plurality of related raw transaction records;

identify one or more selected fields corresponding to one or more selected data categories from each of the plurality of transaction pair records, wherein the one or more selected fields comprise raw information;

wherein the format of the one or more selected fields varies among the transaction pair records such that selected fields are identified based on the use of at least one field identification technique that applies transaction record rules to determine selected fields in at least some transaction pair records;

wherein the one or more selected fields includes at least an entity field;

determine pair match scores corresponding to a plurality of candidate entity names using a similarity measure;

identify a set of top candidate entity names having similar pair match scores;

perform list matching on the set of top candidate entity names using an adjusted similarity measure to identify a top match;

establish the top match as the resolved entity information;

resolve the raw information in the one or more identified selected fields to generate resolved information corresponding to the one or more data categories; and aggregate the resolved information for storing in a data store.

7. The system of claim 6, wherein the one or more selected fields corresponding to one or more selected data categories comprise at least one location field and at least one entity field.

8. The system of claim 7, wherein the at least one location field comprises raw location information and the at least one entity field comprises raw entity information.

9. The system of claim 8, wherein the processing device is configured to resolve the raw location information by:

extracting the raw location information from the one or more location fields;

searching one or more geographic databases based on the extracted raw location information;

identifying, based on the search, a plurality of candidate locations comprising city information and state information;

determining a score for each of the plurality of candidate locations; and identifying a resolved location based on the scores for each of the plurality of candidate locations.

10. The system of claim 8, wherein the processing device is configured to resolve the raw entity information by:

searching an entity database based on an entity query associated with the raw entity information to identify a plurality of candidate entity names; and performing pairwise matching based on the identified plurality of candidate entity names to generate a pair match score for each of the identified plurality of candidate entity names.

11. A non-transitory computer-readable storage medium comprising instructions that, when executed by a processing device, cause the processing device to perform operations comprising:

receiving a plurality of raw transaction records from a plurality of data sources; identifying transaction pairs from the raw transaction records, the transaction pairs including multiple transactions relating to a common transaction between a transaction source and a transaction destination, at least some transaction airs including a source transaction, an intermediate transaction, and a destination transaction;

generating a plurality of transaction pair records from the identified transaction pairs, wherein each transaction pair record comprises a plurality of related raw transaction records;

identifying one or more selected fields corresponding to one or more selected data categories from each of the plurality of transaction pair records, wherein the one or more selected fields comprise raw information;

wherein the format of the one or more selected fields varies among the transaction pair records such that selected fields are identified based on the use of at least one field identification technique that applies transaction record rules to determine selected fields in at least some transaction pair records;

wherein the one or more selected fields includes at least an entity field;

determining pair match scores corresponding to a plurality of candidate entity names using a similarity measure;

identifying a set of top candidate entity names having similar pair match scores;

performing list matching on the set of top candidate entity names using an adjusted similarity measure to identify a top match;

establish the top match as the resolved entity information;

resolving the raw information in the one or more identified selected fields corresponding to the one or more data categories to generate resolved information; and aggregating the resolved information for storing in a data store.

12. The non-transitory computer-readable storage medium of claim 11, wherein the one or more selected fields corresponding to one or more selected data categories comprise at least one location field comprising raw location information and at least one entity field comprising raw entity information.

13. The non-transitory computer-implemented method of claim 12, wherein resolving the raw location information further comprises:

extracting the raw location information from the one or more location fields;

searching one or more geographic databases based on the extracted raw location information;

identifying, based on the search, a plurality of candidate locations comprising city information and state information;
determining a score for each of the plurality of candidate locations;
identifying a resolved location based on the scores for each of the plurality of candidate locations;
searching an entity database based on an entity query associated with the raw entity information to identify a plurality of candidate entity names; and
performing pairwise matching based on the identified plurality of candidate entity names to generate a pair match score for each of the identified plurality of candidate entity names.

* * * * *